United States Patent
Tsukada et al.

(10) Patent No.: US 10,664,739 B2
(45) Date of Patent: May 26, 2020

(54) DUAL IC CARD

(71) Applicant: Toppan Printing Co., Ltd., Taito-ku, Tokyo (JP)

(72) Inventors: Tetsuya Tsukada, Tokyo (JP); Shonosuke Mizoguchi, Tokyo (JP); Eriko Hatakeyama, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/973,399

(22) Filed: Dec. 17, 2015

(65) Prior Publication Data
US 2016/0104065 A1  Apr. 14, 2016

Related U.S. Application Data

(63) Continuation of application No. PCT/JP2014/066253, filed on Jun. 19, 2014.

(30) Foreign Application Priority Data

Jun. 25, 2013 (JP) ................................. 2013-132654
Jun. 25, 2013 (JP) ................................. 2013-132655
Jun. 25, 2013 (JP) ................................. 2013-132899

(51) Int. Cl.
*G06K 19/077* (2006.01)

(52) U.S. Cl.
CPC .. *G06K 19/07784* (2013.01); *G06K 19/07769* (2013.01); *G06K 19/07794* (2013.01)

(58) Field of Classification Search
CPC ........... G06K 19/077; G06K 19/07784; G06K 19/07769; G06K 19/07794
See application file for complete search history.

(56) References Cited

U.S. PATENT DOCUMENTS

| | | | | |
|---|---|---|---|---|
| 6,836,248 B2 * | 12/2004 | Fukushima | ............ | H01Q 1/242 343/700 MS |
| 7,286,053 B1 * | 10/2007 | Gudeman | .......... | G08B 13/2414 340/572.1 |

(Continued)

FOREIGN PATENT DOCUMENTS

| | | |
|---|---|---|
| JP | H08-090965 | 4/1996 |
| JP | H11-296646 | 10/1999 |

(Continued)

OTHER PUBLICATIONS

International Search Report issued in PCT/JP2014/066253 dated Jul. 29, 2014.

(Continued)

*Primary Examiner* — Thien M Le
*Assistant Examiner* — Asifa Habib
(74) *Attorney, Agent, or Firm* — Foley & Lardner LLP

(57) ABSTRACT

A dual IC card of the present invention includes: an IC module having a contact terminal portion contacting an external machine, a connecting coil configuring a contactless terminal portion by electromagnetic coupling, and an IC chip having a contact communication function and a contactless communication function; an antenna formed along a coil wiring path that defines an inductance and having a coupling coil portion electromagnetically coupling with the connecting coil of the IC module, a main coil portion formed along a coil wiring path that defines an inductance and connected to the coupling coil portion for performing contactless communication with the external machine, and a resistance-increasing portion provided in a section that forms the coil wiring path of at least one of the coupling coil portion and the main coil portion increase electrical resistance in the section; and a plate-like card body in which the antenna is arranged.

20 Claims, 15 Drawing Sheets

(56) References Cited

U.S. PATENT DOCUMENTS

| | | | |
|---|---|---|---|
| 2002/0015002 A1 | 2/2002 | Yasukawa et al. | |
| 2011/0207422 A1* | 8/2011 | Ban | H01Q 1/48 455/128 |
| 2012/0037710 A1* | 2/2012 | Le Garrec | G06K 7/10178 235/492 |
| 2013/0075477 A1 | 3/2013 | Finn et al. | |
| 2013/0146671 A1* | 6/2013 | Grieshofer | G06K 19/07794 235/492 |
| 2014/0014732 A1* | 1/2014 | Finn | G06K 19/077 235/492 |
| 2014/0224886 A1* | 8/2014 | Nihei | H01Q 7/00 235/492 |
| 2014/0320367 A1* | 10/2014 | Alkhateeb | H01Q 1/3291 343/804 |
| 2016/0118711 A1* | 4/2016 | Finn | G06K 19/07769 343/867 |
| 2016/0188926 A1* | 6/2016 | Pachler | G06K 7/10336 235/487 |

FOREIGN PATENT DOCUMENTS

| | | |
|---|---|---|
| JP | 2001-229360 | 8/2001 |
| JP | 2006-202174 A | 8/2006 |
| WO | WO-96/35190 A1 | 11/1996 |
| WO | WO-98/15916 A1 | 4/1998 |
| WO | WO-99/26195 A1 | 5/1999 |
| WO | WO-2013/073702 A1 | 5/2013 |

OTHER PUBLICATIONS

Office Action dated Mar. 7, 2017 in Japanese Patent Application No. 2013-132654.

Extended European Search Report dated Mar. 20, 2017 in corresponding European Application No. 14817792.6.

Office Action issued in corresponding JP Patent application No. 2013-132655 dated Sep. 4, 2017.

\* cited by examiner

DUAL IC CARD

CROSS-REFERENCE TO RELATED PATENT APPLICATIONS

This application is a continuation application filed under 35 U.S.C. 111(a) claiming the benefit under 35 U.S.C. §§ 120 and 365(c) of PCT International Application No. PCT/JP2014/066253 filed on Jun. 19, 2014, which is based upon and claims the benefit of priority of Japanese Application Nos. 2013-132654, 2013-132655, and 2013-132899, all filed on Jun. 25, 2013, the entire contents of them all are hereby incorporated by reference.

TECHNICAL FIELD

The present invention relates to a dual IC card, and relates to a dual IC card capable of performing contact communication and contactless communication, for example.

The present application claims priority from Japanese Patent Application Nos. 2013-132654, 2013-132655 and 2013-132899 all filed in Japan on Jun. 25, 2013, the descriptions of which are incorporated herein by reference.

BACKGROUND

There have been proposed dual IC cards capable of performing contact communication and contactless communication. For example, PTLs 1 to 3 each describe a dual IC card that includes an IC module having a communication function. The IC module is electromagnetically coupled (transformer-coupled) to an antenna provided to a card body to eliminate electrical contact between the IC module and the antenna.

With such a dual IC card having a contact communication function and a contactless communication function, communication modes can be used according to the user's applications. Thus, dual IC cards have been used for various applications. In such a dual IC card of recent years, an IC module having an antenna is joined to a card body by means of an insulative adhesive or the like, with another antenna being embedded in the card body. Thus, the dual IC card is ensured to be capable of receiving power supply and performing communication between the IC module and the card body by the electromagnetic coupling occurring between the antenna of the IC module and the antenna provided to the card body. By configuring the dual IC card in this way, unstable electrical connection between the IC module and the card body can be minimized. This is because, if the IC module and the card body are directly connected via a conductive connecting member, such as solder, the connecting member may be broken when the dual IC card is bent or the connecting member will be deteriorated with age.

As such a dual IC card in which an IC module and the card body are electrically connected by electromagnetic coupling, the IC cards described in PTLs 1 to 3 are known, for example.

In an IC module for a dual IC card, a terminal (contact terminal portion) for an interface that contacts an external contact machine is formed on a front surface, while a connecting coil for transformer-coupling (electromagnetic coupling) is formed on a back surface.

The card body includes an antenna substrate having a first surface of a sheet-like resin (substrate) which is provided with a coupling coil formed of a printed coil, and an antenna coil (main coil) both of which are ensured to be resin-sealed. The coupling coil is looped to surround an outer side of the IC chip in the IC module, when viewed in a thickness direction of the sheet-like resin.

The coupling coil of the card body is transformer-coupled with the connecting coil, and hence power supply can be received and communication can be performed between the antenna coil and an external contactless machine, such as a reader/writer.

As the applications of the dual IC cards, contact communication is used for applications that need reliability and security, such as large quantities of data exchange by credit-card transactions or communication for account settlement procedures. In contrast, contactless communication is used for applications where the communication data volume is small and the main communication is authentication, such as gate control for allowing someone to enter or leave a room.

CITATION LIST

Patent Literature

Patent Literature 1: WO 99/26195
Patent Literature 2: WO 98/15916
Patent Literature 3: WO 96/35190

SUMMARY OF THE INVENTION

Technical Problem

However, the conventional dual IC cards as described above have the following problem.

In the case of the dual IC cards capable of performing contact communication and contactless communication, contactless communication is performed using, for example, Type-A and Type-B methods defined in ISO 14443. These methods involve use of a subcarrier for data transmission from the dual IC card to a reader/writer that serves as an external machine.

In this regard, in the dual IC card in which the IC module and the antenna are electromagnetically coupled, the antenna provided to the card body is not directly connected to the IC chip, and hence the load imposed on a resonant circuit becomes lower than in the case where the antenna is directly connected to the IC chip. In other words, a Q value of the resonant circuit becomes high in the dual IC card as a whole.

Accordingly, if the resonance frequency in the dual IC card varies relative to the carrier due to fabrication variations or the like, for example, the level difference between the upper sideband and the lower sideband is increased, which may adversely affect the communication quality.

Furthermore, the conventional dual IC cards as described above have the following problem.

In the conventional dual IC cards, the antenna formed of a coupling coil portion and a main coil portion is embedded in the card body made of plastic, and the IC module is located in a recess formed in the vicinity of the coupling coil portion in the card body.

In an area in the vicinity of the recess, the thickness of the card body drastically changes, and hence when an external bending force is applied to the card body, a stress is concentrated on an outer side of the bottom of the recess. Accordingly, the dual IC card tends to be easily broken from the recess.

Particularly in a dual IC card of the type electromagnetically coupled with an IC module, the coupling coil is located in an area that overlaps with the recess or in an area in the vicinity of the recess. Therefore, wiring of the coupling coil is adversely affected by the stress concentration mentioned above and easily disconnected even if the card body is not broken. If the coupling coil is disconnected, the electromagnetic coupling between the IC module and the antenna is impaired, and hence contactless communication cannot be performed.

Furthermore, in the conventional dual IC cards, the number of times the connecting coil of the IC module is looped and the number of times a second coupling coil of the card body is looped are adjusted to thereby achieve impedance matching and optimize power supply to the IC chip.

However, the location of the second coupling coil in the card body is limited because the location of the IC module relative to the card body is determined by a standard (JIS X6320-2: 2009 (ISO/IEC 7816: 2007)), or the card body needs to be provided with an embossed area (e.g., JIS X6302-1: 2005 (ISO/IEC 7811-1: 2002)) where an emboss can be formed.

The present invention has been made in view of the problems set forth above, and has an object of providing a dual IC card realizing a configuration in which a resonant circuit has a lower Q value, with an IC module being electromagnetically coupled to an antenna, and ensuring stable communication quality.

The present invention has been made in view of the problems set forth above, and has an object of providing a dual IC card that decreases or minimizes the occurrence of failure due to breakage of a coupling coil when an external force causes a bending stress.

The present invention has been made in view of the problems set forth above, and has an object of providing a dual IC card increasing the degree of freedom in arranging a coupling coil in a card body.

Solution to Problem

To solve the problems set forth above, the present invention proposes the following aspects:

A dual IC card according to a first aspect of the present invention includes: an IC module including a contact terminal portion contacting an external machine, a connecting coil configuring a contactless terminal portion by electromagnetic coupling, and an IC chip having a contact communication function and a contactless communication function; an antenna including a coupling coil portion formed along a coil wiring path that defines an inductance and electromagnetically coupling with the connecting coil of the IC module, a main coil portion formed along a coil wiring path that defines an inductance and connected to the coupling coil portion to perform contactless communication with the external machine, and a resistance-increasing portion provided in a section that forms the coil wiring path of at least one of the coupling coil portion and the main coil portion to increase electrical resistance in the section; and a plate-like card body in which the antenna is arranged. In the resistance-increasing portion, a resistance wiring portion is provided in the section, the resistance wiring portion having a line length larger than a length of a direct connection hypothetically provided to short-cut a first point and a second point that define the section, having the same cross-sectional area as that of the direct connection, and being formed of the same material as that of the direct connection. The resistance wiring portion provided in the section has an electrical resistance higher than that of the direct connection provided in the section.

The coil wiring path that defines an inductance may be a wiring path configured by a coil which is looped once, or a spiral wiring path configured by a spiral coil which is looped a plurality of numbers of times.

In the dual IC card according to the first aspect of the present invention, it is preferably that the electrical resistance of the resistance wiring portion in the resistance-increasing portion is higher by a factor of two or more than that of the direct connection provided in the section.

In the dual IC card according to the first aspect of the present invention, it is preferable that the resistance-increasing portion is configured by a wiring pattern including a first bent pattern that intersects the direct connection a plurality of times.

In the dual IC card according to the first aspect of the present invention, it is preferable that the wiring pattern configuring the resistance-increasing portion includes second bent patterns arranged parallel to the direct connection in a multiple manner.

In the dual IC card according to the first aspect of the present invention, it is preferable that the resistance-increasing portion is provided in the main coil portion.

In the dual IC card according to the first aspect of the present invention, it is preferable that the card body has an embossed portion formed therein; and the resistance-increasing portion is formed in an area that does not overlap with the embossed portion.

In the dual IC card according to the first aspect of the present invention, it is preferable that the card body has a rectangular contour, in plan view, having a first long side portion and a second long side portion; the first long side portion is provided, in the vicinity, with an emboss-processing-enabled area that is located along the first long side portion; the second long side portion is provided, in the vicinity, with an emboss-processing-prohibited area that is located along the second long side portion; and the resistance-increasing portion is formed in the emboss-processing-prohibited area.

In the dual IC card according to the first aspect of the present invention, it is preferable that the card body is formed into a rectangular shape; and the resistance-increasing portion is formed on the coil wiring path that is linear and extends along a long side of the card body, in an outermost of the main coil portion.

In the dual IC card according to the first aspect of the present invention, it is preferable that the resistance-increasing portion is formed of an aluminum layer having a thickness of not more than 30 μm.

In the dual IC card according to the first aspect of the present invention, it is preferable that the resistance-increasing portion is formed of an aluminum layer having a line width of not more than 0.4 mm.

A dual IC card according to a second aspect of the present invention includes: an IC module including a contact terminal portion contacting an external machine, a connecting coil configuring a contactless terminal portion by electromagnetic coupling, and an IC chip having a contact communication function and a contactless communication function; an antenna including a coupling coil portion for electromagnetically coupling with the connecting coil of the IC module, and a main coil portion connected to the coupling coil portion to perform contactless communication with the external machine; and a plate-like card body in which the antenna is arranged and a recess is formed for accommodation of the IC module. The coupling coil portion is located at a position outside the recess of the card body when viewed from an opening side of the recess.

In the dual IC card according to the second aspect of the present invention, it is preferable that the card body is formed into a rectangular plate, the recess has an opening formed into a substantially rectangular shape having four linear portions parallel to a contour of the card body; and the coupling coil portion has a an innermost wiring with a line width of not less than 1 mm at a position where the innermost wiring intersects an extension line of one linear portion among the four linear portions, the linear portion being formed at a position nearest to a center of the card body in a direction of a shorter dimension of the card body and extended in a longitudinal direction of the card body.

In the dual IC card according to the second aspect of the present invention, it is preferable that the innermost wiring of the coupling coil portion includes a thick line portion having a line width of not less than 1 mm and a thin line portion having a line width of less than 1 mm at positions sandwiching the extension line; and the thick line portion and the thin line portion are connected via a line width transition portion that has a width gradually increasing from the line width of the thin line portion to the line width of the thick line portion.

A dual IC card according to a third aspect of the present invention includes: an IC module including a contact terminal portion contacting an external machine, a connecting coil configuring a contactless terminal portion by electromagnetic coupling, and an IC chip having a contact communication function and a contactless communication function; an antenna including a coupling coil for electromagnetically coupling with the connecting coil of the IC module, and a main coil connected to the coupling coil to perform contactless communication with an external contactless machine; and a plate-like card body in which a recess is formed for accommodation of the IC module. The card body has a substrate. The coupling coil includes a first coil segment provided to a first surface that serves as an opening side of the recess of the substrate, and a second coil segment provided to a second surface of the substrate.

In the dual IC card according to the third aspect of the present invention, it is more preferable that the second coil segment is formed by being looped around the IC module once when viewed in a thickness direction of the substrate.

In the above-described dual IC card, it is more preferable that the first coil segment and the second coil segment at least partially overlap with each other when viewed in the thickness direction of the substrate; and the first coil segment and the second coil segment have respective element wires with different line width in portions where the first coil segment and the second coil segment overlap with each other in the thickness direction.

In the dual IC card according to the third aspect of the present invention, it is more preferable that the first coil segment and the second coil segment have respective element wires whose difference in line width is not less than 0.5 mm in portions where the first coil segment and the second coil segment overlap with each other in the thickness direction.

Advantageous Effects of Invention

According to the dual IC card related to the first aspect of the present invention, the antenna includes the resistance-increasing portion. Accordingly, there is an advantageous effect of being able to realize a configuration that achieves a lower Q value in the resonant circuit while electromagnetically coupling the IC module to the antenna, and obtain stable communication quality.

According to the dual IC card related to the second aspect of the present invention, the coupling coil portion is arranged at the position outside the recess. Accordingly, there is an advantageous effect of being able to decrease or even minimize failure due to a disconnection in the coupling coil in the event that a bending stress due to an external force is generated.

According to the dual IC card related to the third aspect of the present invention, the degree of freedom in arranging the coupling coil in the card body can be increased.

DESCRIPTION OF REPRESENTATIVE EMBODIMENTS

First Embodiment

With reference to the drawings, a first embodiment of a dual IC card according to the present invention will be described.

Figure 1:
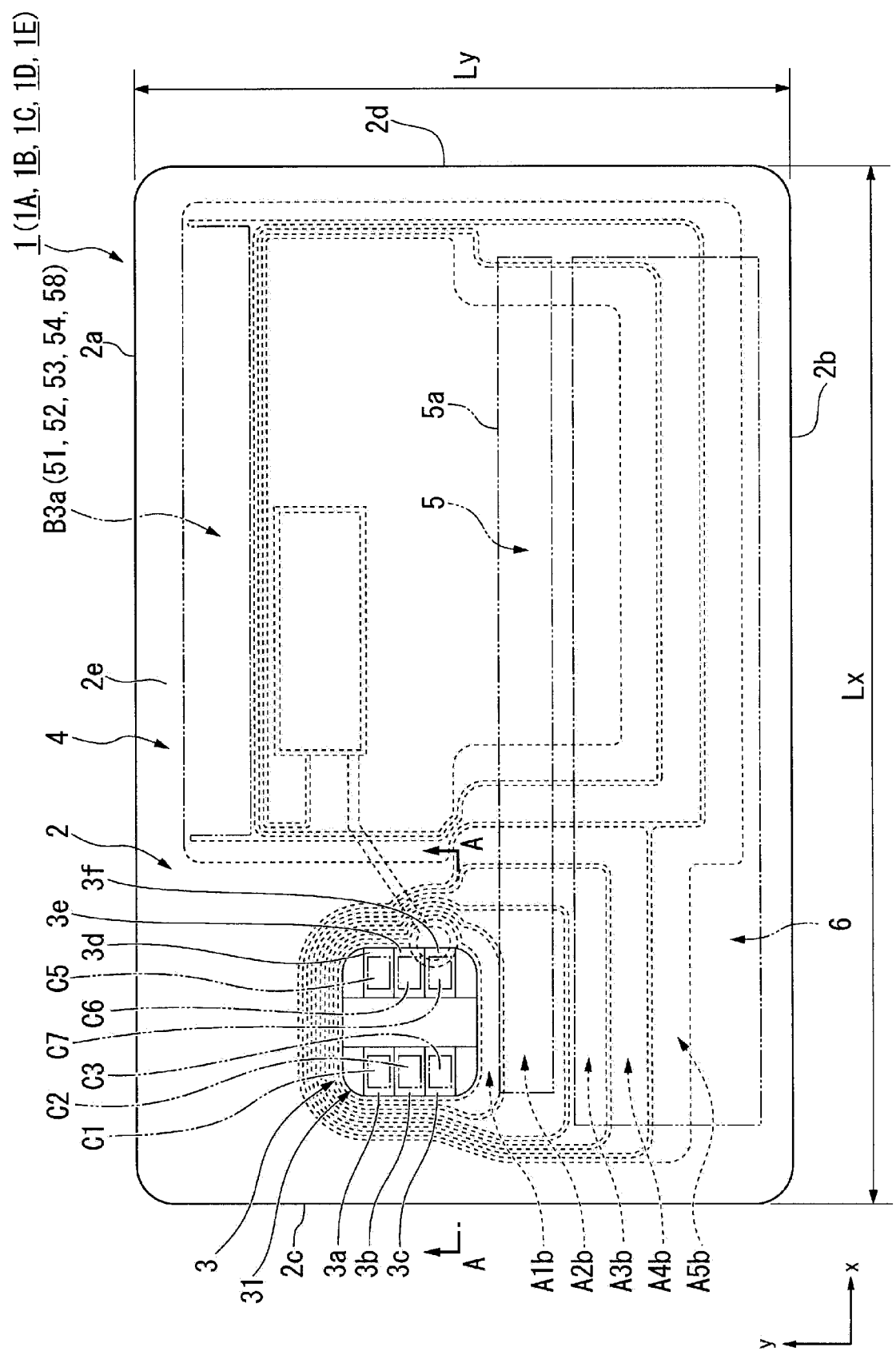
FIG. 1 is a schematic plan view illustrating a dual IC card according to a first embodiment of the present invention.
Figure 2:
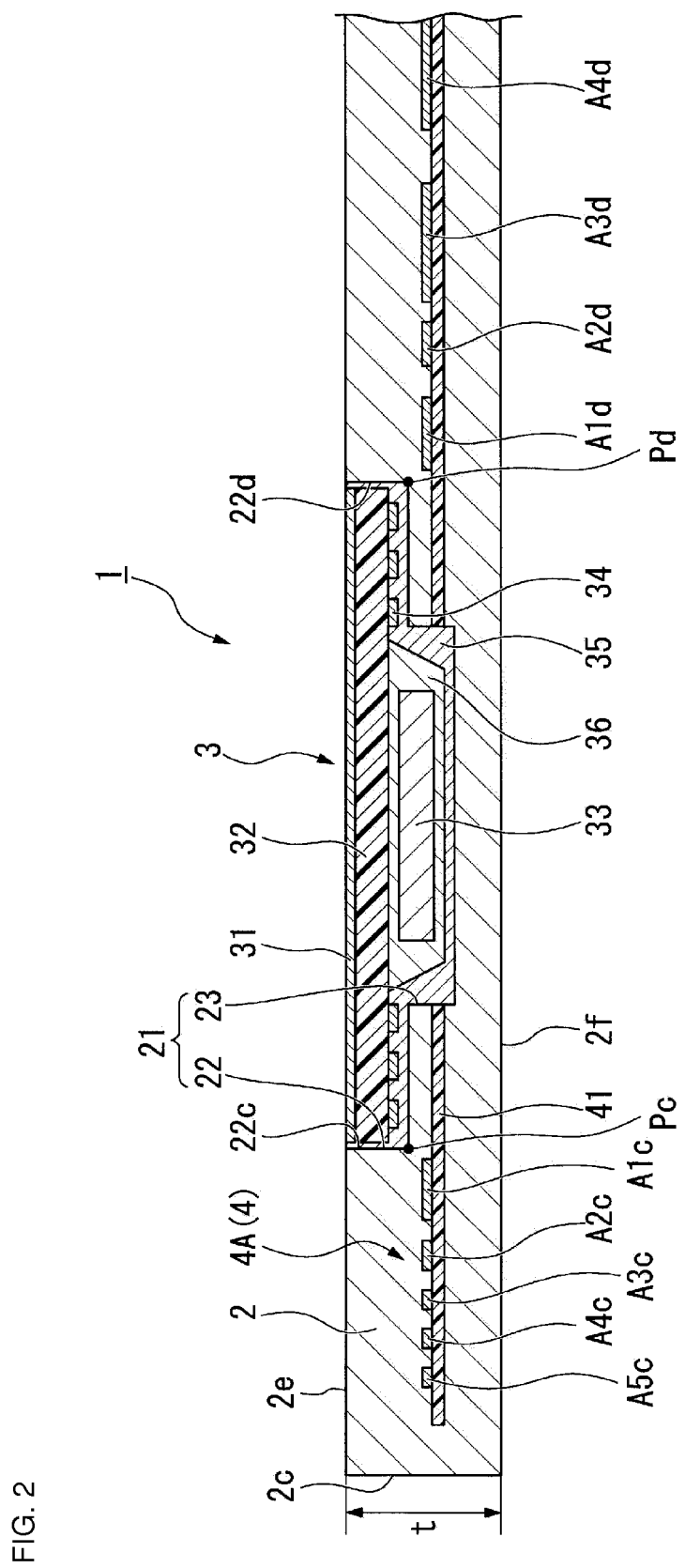
FIG. 2 is a cross section taken along a line A-A of FIG. 1.
Figure 3:
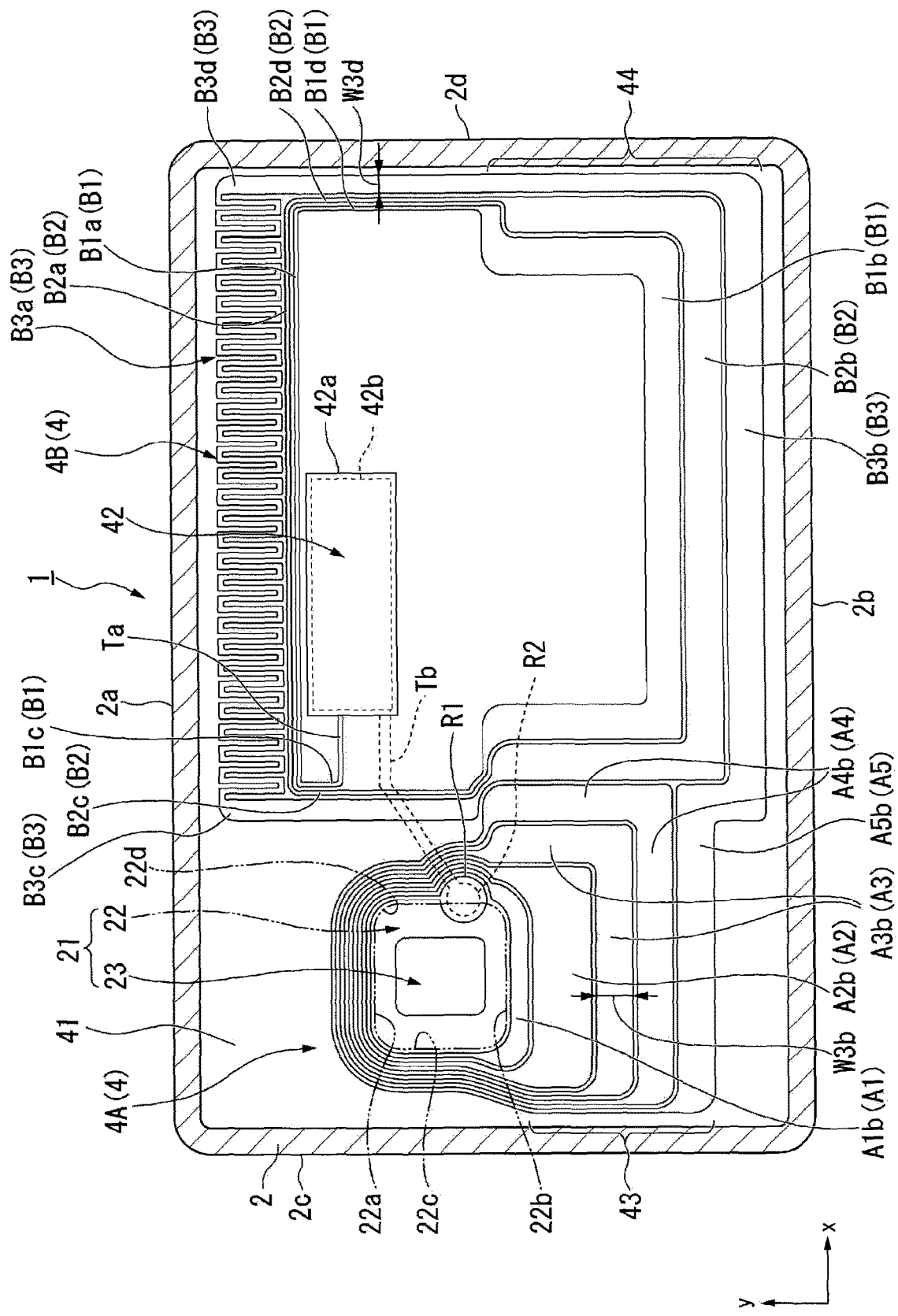
FIG. 3 is a schematic plan view illustrating an arrangement of an antenna of the dual IC card according to the first embodiment of the present invention.
Figure 4:
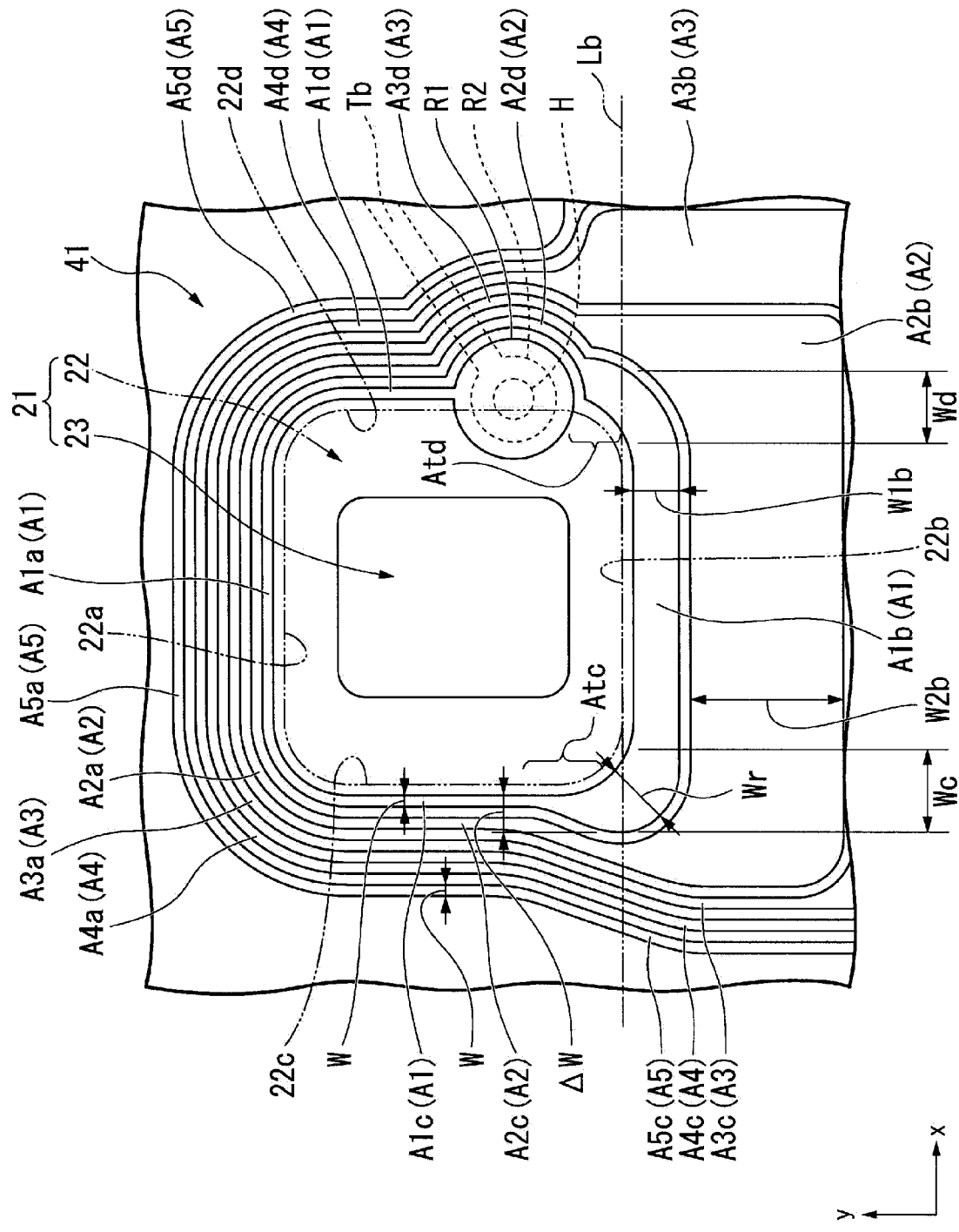
FIG. 4 is a schematic enlarged view illustrating a coupling coil portion provided in the vicinity of a recess of the dual IC card according to the first embodiment of the present invention.
Figure 5A:
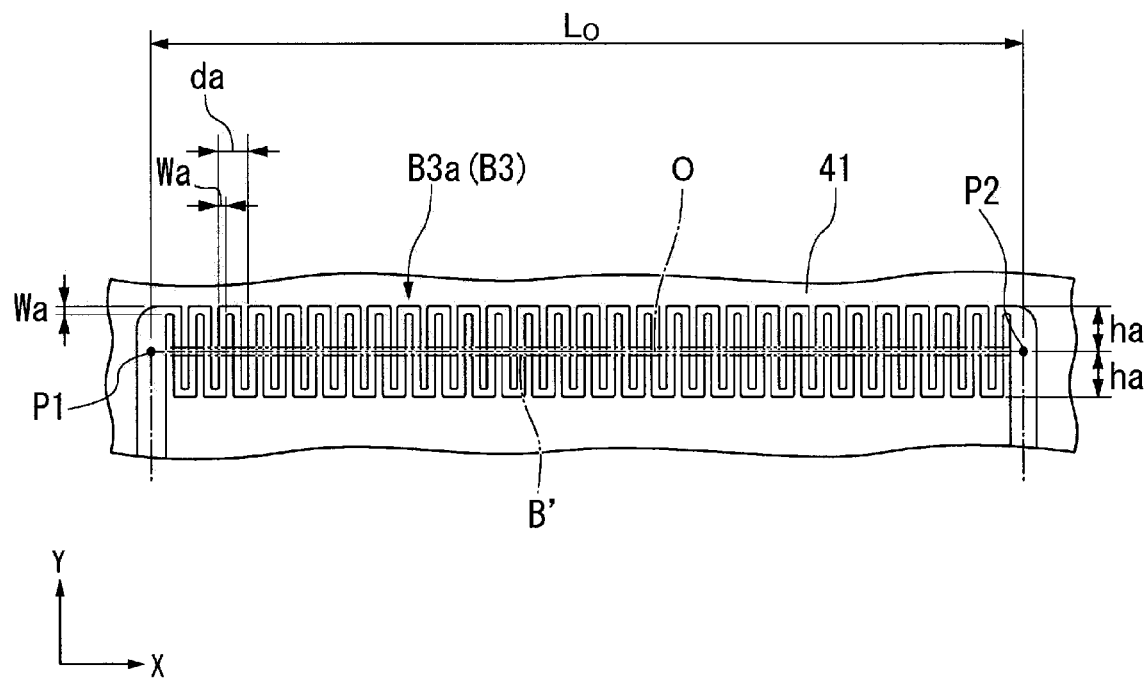
FIG. 5A is a partially enlarged plan view that shows illustrating a resistance-increasing portion, and a schematic diagram illustrating a wiring pattern, in the dual IC card according to the first embodiment of the present invention.
Figure 5B:
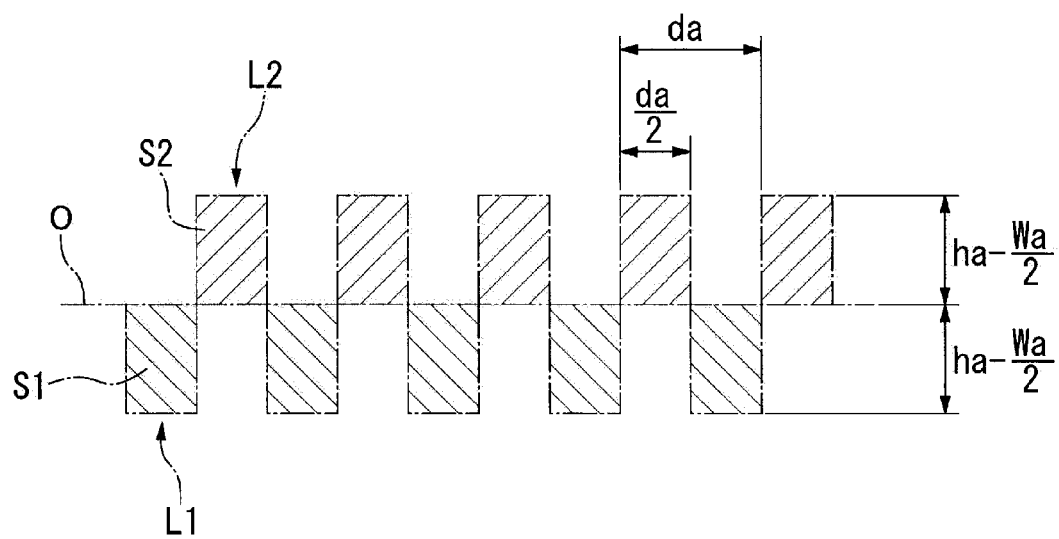
FIG. 5B is a partially enlarged plan view that shows illustrating a resistance-increasing portion, and a schematic diagram illustrating a wiring pattern, in the dual IC card according to the first embodiment of the present invention.

FIG. 1 is a schematic plan view illustrating the dual IC card according to the first embodiment of the present invention. FIG. 2 is a cross section taken along a line A-A of FIG. 1. FIG. 3 is a schematic plan view illustrating an arrangement of an antenna of the dual IC card according to the first embodiment of the present invention. FIG. 4 is a schematic enlarged view illustrating a coupling coil portion provided in the vicinity of a recess of the dual IC card according to the first embodiment of the present invention. FIG. 5A is a partially enlarged plan view illustrating a resistance-increasing portion in the dual IC card according to the first embodiment of the present invention. FIG. 5B is a schematic diagram illustrating a wiring pattern of FIG. 5A.

As shown in FIGS. 1 to 3, a dual IC card 1 according to the first embodiment is a device capable of performing contact communication and contactless communication between the dual IC card 1 and an external machine. The dual IC card 1 includes a card body 2 having a substantially rectangular outline in plan view, as well as an IC module 3 and an antenna 4 provided to the card body 2.

The shape or an outline that can be used for the dual IC card 1 may be one that conforms, as appropriate, to card standards.

The card body 2 is formed into a plate-like shape with a width Lx along a long side (see FIG. 1), a width Ly along a short side (see FIG. 1, Ly<Lx), and a thickness t (see FIG. 2), and has a substantially rectangular contour, with the four corners being rounded in plan view. For example, if the dual IC card 1 conforms to JIS X6301: 2005 (ISO/IEC 7816: 2003), the nominal values of Lx, Ly and t are Lx=85.60 (mm), Ly=53.98 (mm), t=0.76 (mm), while a corner R is R=3.18 (mm).

Materials that can be used for the card body 2 include resin materials that can provide appropriate electrically insulating properties and durability. As examples of favorable materials, mention can be made, for example, of vinyl chloride-based materials, such as polyvinyl chloride (PVC), polycarbonate-based materials, polyethylene terephthalate copolymers (PET-G), and the like.

A configuration that can be used for the card body 2 includes a configuration in which two or more card bases made of the above materials are laminated with each other.

The card body 2 has a front surface 2e on which characters or the like, not shown, are described or emboss-molded in a relief-like manner. On the surface 2e, these characters or the like expressing information are arrayed in a correct orientation in a state where long sides are horizontally located as shown in FIG. 1.

When the card body 2 is located as mentioned above, a side surface that configures the upper long side is hereinafter referred to as a first long side portion 2a, a side surface that configures the lower long side as a second long side portion 2b, a side surface that configures a left short side as a first short side portion 2c, and a side surface that configures a right short side as a second short side portion 2d.

For convenience of referring to directions, a direction along the long sides may be referred to as an x direction and a direction along the short sides may be referred to as a y direction.

Hereinafter, the IC module 3 arranged in the card body 2 will be described.

As shown in FIG. 2, the IC module 3 has a connecting terminal portion 31 (a contact terminal portion) brought into contact with an external machine for electrical connection therewith, a connecting coil 34 that configures a contactless terminal portion that causes electromagnetic coupling, and an IC chip 33 having a contact communication function and a contactless communication function.

The connecting terminal portion 31 is configured with a plurality of electrodes formed on one surface of a module substrate 32. The electrodes are exposed to the outside of the card body 2 while being aligned to the front surface 2e of the card body 2. As long as the terminal position of the connecting terminal portion 31 satisfies the terminal position defined in the ISO/JIS standard, the contour and dimension of each of the contact terminal portion 31 and the module substrate 32 are not particularly limited.

The contour of the connecting terminal portion 31, in plan view, is ensured to coincide with the contour of the module substrate 32. As shown in FIG. 1, the connecting terminal portion 31 has a rectangular shape with its four corners being rounded.

Linear portions of the contours of the connecting terminal portion 31 and the module substrate 32 are extended along the x or y direction.

The shape or arrangement of each electrode of the connecting terminal portion 31 is set based on the standard to which the dual IC card 1 conforms. In the first embodiment, the connecting terminal portion 31 is positioned in the vicinity of the first short side portion 2c in terms of the x direction, while being positioned somewhat closer to the first long side portion 2a than to a widthwise center in terms of the y direction.

For example, the shape shown as an example in FIG. 1 corresponds to a terminal arrangement defined in JIS X6320-2: 2009 (ISO/IEC 7816: 2007).

Specifically, according to the definition of the standard, a first terminal portion 3a, a second terminal portion 3b, and a third terminal portion 3c are arrayed along the y direction, for contact with the "C1 terminal", the "C2 terminal", and the "C3 terminal", respectively. Furthermore, according to the definition of the standard, a fourth terminal portion 3d, a fifth terminal portion 3e, and a sixth terminal portion 3f are arrayed at positions facing these respective terminals in the x direction, for contact with the "C5 terminal", the "C6 terminal", and the "C7 terminal", respectively. In FIG. 1, the position of the "C1 terminal" or the like is indicated by a two-dot chain line on the first terminal portion 3a or the like, with a sign C1 or the like being assigned.

The first, second, third, fourth, fifth, and sixth terminal portions 3a, 3b, 3c, 3d, 3e, and 3f are electrically connected to the IC chip 33 via wiring, not shown.

To realize such an electrode arrangement, the contour of the connecting terminal portion 31 in the first embodiment has an x-direction width of 13.0 mm and a y-direction width of 11.8 mm.

Further, in the contour of the connecting terminal portion 31, a side nearest to the first short side portion 2c of the card body 2 among the plurality of sides forming the contour is located at a position spaced apart from the first short side portion 2c by 9.0 mm in the x direction. A side nearest to the second long side portion 2b of the card body 2 among the plurality of sides forming the contour of the connecting terminal portion 31 is located at a position spaced apart from the second long side portion 2b by 26.0 mm in the x direction.

As shown in FIGS. 1 and 2, the connecting coil 34 is arranged being formed into a spiral shape and being looped around the IC chip 33 on the module substrate 32 along the contour of the connecting terminal portion 31, the arrangement being on an opposite side of the connecting terminal portion 31. The connecting coil 34 is electrically connected to the IC chip 33.

The IC chip 33 is arranged on the module substrate 32 so as to be located inner side of the connecting coil 34, the arrangement being on the opposite side of the connecting terminal portion 31. The IC chip 33 is electrically connected to the connecting terminal portion 31 and the connecting coil 34 via wiring, not shown.

To fabricate such an IC module 3, the module substrate 32 is prepared first, which is configured by a glass epoxy substrate or an insulating substrate, such as a PET sheet, having a thickness of 50 µm to 200 µm, for example. Afterwards, a copper foil pattern or the like formed by etching or the like is provided, for example, to the front and back surfaces of the module substrate 32 to thereby form a wiring pattern that includes the connecting terminal portion 31 and the connecting coil 34. At this time, if the wirings formed on the front and back surfaces of the module substrate 32 need to be connected, a through hole or the like, for example, is formed in the module substrate 32 to electrically connect these wirings with each other.

Exposed portions of the copper foil pattern formed on each of the front and back surfaces are furnished with a nickel plating of thickness 0.5 µm to 3 µm, for example, and further, the nickel plating layer is furnished with a gold plating of thickness 0.01 µm to 0.3 µm.

The IC chip 33 is bonded to the back surface of the module substrate 32 by means of a die-attach adhesive, for example. For example, the IC chip 33 is connected to the connecting terminal portion 31, the connecting coil 34, or a wiring pattern connected to them, by performing wire bonding using a wire of gold, copper, or the like, having a diameter of 10 µm to 40 µm. The IC chip 33 is sealed by a resin seal 36 made such as of an epoxy resin, for example.

Such a fabrication method is only an example. For example, using another method, the connecting terminal portion 31 may be formed of a lead frame having a thickness of 50 µm to 200 µm, and the connecting coil 34 may be formed on a back surface of the lead frame using a copper wire.

As shown in FIGS. 2 and 3, to accommodate the IC module 3 having such a configuration, the card body 2 is formed with an IC module accommodating portion 21 that is a recess opening in the front surface 2e.

The IC module accommodating portion 21 includes an substantially rectangular first hole portion 22 and an substantially rectangular second hole portion 23. The first hole portion 22 has an opening into which the connecting terminal portion 31 and the module substrate 32 are fitted, the opening being larger than the contour of the module substrate 32. The second hole portion 23 accommodates the resin seal 36 which protrudes from the module substrate 32 by a length larger than the length by which the connecting coil 34 protrudes from the module substrate 32. The second hole portion 23 is provided to a bottom of the first hole portion 22.

As indicated in FIGS. 3 and 4 by the two-dot chain line, a linear portion of the opening of the first hole portion 22 in plan view is made up of a first side surface portion 22a parallel to and nearest to the first long side portion 2a among a plurality of sides configuring the first hole portion 22, a second side surface portion 22b parallel to and nearest to the second long side portion 2b among the plurality of sides configuring the first hole portion 22, a third side surface portion 22c parallel to and nearest to the first short side portion 2c among the plurality of sides configuring the first hole portion 22, and a fourth side surface portion 22d parallel to and nearest to the second short side portion 2d among the plurality of sides configuring the first hole portion 22.

The first side surface portion 22a is formed at a position apart from the first long side portion 2a by 16.6 mm.

The second side surface portion 22b is formed at a position apart from the second long side portion 2b by 25.4 mm, and is positioned at substantially the widthwise center of the card body 2 in the y direction.

The third side surface portion 22c is formed at a position apart from the first short side portion 2c by 8.4 mm.

The fourth side surface portion 22d is formed at a position apart from the second short side portion 2d by 64.0 mm, and is formed at a position closer to the first short side portion 2c than to the widthwise center of the card body 2 in the x direction.

In the opening of the IC module accommodating portion 21 formed in this way, the second side surface portion 22b is formed at a position nearest to the center of the card body 2 in the short side direction of the card body 2, among the four linear portions, namely, the first, second, third, and fourth side surface portions 22a, 22b, 22c, and 22d. The second side surface portion 22b is a linear portion that extends in a longitudinal direction of the card body 2.

As shown in FIG. 2, the depth of the first hole portion 22 is set to be larger than the sum of the thicknesses of the connecting terminal portion 31, the module substrate 32, and the connecting coil 34. Accordingly, the depth of the first hole portion 22 is determined such that a gap is formed between the bottom of the first hole portion 22 and the connecting coil 34, with the front surface of the connecting terminal portion 31 being aligned to the front surface 2e.

The depth of the second hole portion 23 is determined such that a gap is formed between the bottom of the second hole portion 23 and the resin seal 36, with the front surface of the connecting terminal portion 31 being aligned to the front surface 2e.

The IC module 3 is fitted to, and fixed by bonding to, the IC module accommodating portion 21 having the above configuration, such that the front surface of the connecting terminal portion 31 falls within a range defined in JIS X6320-1: 2009 (ISO 7816-1: 1998, Amd1: 2003) relative to the front surface 2e.

Accordingly, as shown in FIG. 2, an adhesive layer 35 made of a solidified adhesive is formed between the bottom of each of the first and second hole portions 22 and 23, and the module substrate 32. However, there can also be adopted a configuration in which no adhesive layer 35 is arranged at the bottom of the second hole portion 23.

Character information can be appropriately provided by emboss-molding in a specific area of the card body 2. In the first embodiment, emboss-molding can be performed in a first embossed area 5 (an emboss-processing-enabled area) and a second embossed area 6 (an emboss-processing-enabled area) shown in FIG. 1.

For example, when conforming to JIS X6302-1: 2005 (ISO/IEC 7811-1: 2002), the first embossed area 5 serves as an "identification number area" where one row of character strings can be provided by emboss-molding. The second embossed area 6 serves as a "name and address area" where one row of character strings can be provided by emboss-molding.

The range of the first and second embossed areas 5 and 6 corresponds to a stripe-like area that extends in the longitudinal direction of the card body 2. The first and second embossed areas 5 and 6 are arranged in this order in a direction from the first long side portion 2a toward the second long side portion 2b in the y direction. A specific layout position of each of the first and second embossed areas 5 and 6 is defined in the above standard.

For example, a boundary 5a of the first embossed area 5 on the first long side portion 2a side (boundary portion of the first embossed area 5, the portion being closer to the first long side portion 2a than to the second long side portion 2b) is positioned being spaced apart from the second long side portion 2b by a maximum of 24.03 mm, so as to be positioned slightly closer to the second long side portion 2b than to the widthwise center in the y direction.

The x-direction range of each of the first and second embossed areas 5 and 6 (the width range) corresponds to a range obtained by removing areas of approximately a few millimeters positioned in the vicinity of the first and second short side portions 2c and 2d (areas ranging from both ends in inward directions), from the x-direction width range of the dual IC card 1.

A configuration of the antenna 4 will now be described.

The antenna 4 is electromagnetically coupled to the IC chip 33 via the connecting coil 34 of the IC module 3 to enable electric power supply to the IC chip 33 from outside and enables contactless communication between the IC chip 33 and an external machine, not shown. As shown in FIG. 3, the antenna 4 is formed on a front surface of a sheet substrate 41 formed of an insulator in a rectangular shape in plan view which is smaller than the contour of the card body 2, and embedded in substantially the center portion in the thickness direction of the card body 2.

The antenna 4 in the thickness direction is laid out at a position deeper than the position of the bottom surface of the first hole portion 22 but shallower than the position of the bottom surface of the second hole portion 23, in the IC module accommodating portion 21. Accordingly, a substantially rectangular hole that is in the same shape as that of the second hole portion 23 is formed through the sheet substrate 41.

A schematic configuration of the antenna 4 includes a coupling coil portion 4A and a main coil portion 4B, each of which is formed of a wiring arranged on the sheet substrate 41, and a capacitive element 42 connected between an end of the coupling coil portion 4A and an end of the main coil portion 4B.

The coupling coil portion 4A is arranged in the vicinity of the connecting coil 34 of the IC module 3, for electromagnetic coupling with the connecting coil 34 of the IC module 3. The coupling coil portion 4A is configured by a wiring that is looped around the connecting coil 34 one to ten times (i.e., 1 to 10 times looping) in an outer area of the coil.

In the first embodiment, the coupling coil portion 4A is configured by a wiring which is looped around the connecting coil 34 five times in the outer area of the coil. The wiring of the coupling coil portion 4A is formed by patterning a metal layer having a thickness T by etching or the like.

As shown in FIG. 4, a substantially circular land portion R1 for establishing electrical continuity with the capacitive element 42 is formed at an innermost end of the coupling coil portion 4A.

The land portion R1 according to the first embodiment is formed at a position that intersects the fourth side surface portion 22d of the first hole portion 22 so as to be located in a portion on the sheet substrate 41.

The land portion R1 is electrically connected to a substantially circular land portion R2 which is formed by crimping on the back surface of the sheet substrate 41. The land portions R1 and R2 may be electrically connected to each other by means of an electrically conductive paste, resistance welding, laser welding, or the like.

A coil wiring A1 configuring innermost first looping of the coupling coil portion 4A is made up of a thin line portion A1d having a line width W and routed from the land portion R1 along the fourth side surface portion 22d, a thin line portion A1a having a line width W and routed along the first side surface portion 22a, a thin line portion A1c having a line width W and routed along the third side surface portion 22c, and a thick line portion A1b having a line width W1b and routed along the second side surface portion 22b. The line width can have a relationship expressed by W1b>W.

A coil wiring A2 that configures second looping of the coupling coil portion 4A is routed along the outer side of the coil wiring A1, from an end of the thick line portion A1b of the coil wiring A1, the end being close to the second short side portion 2d, including the land portion R1. The coil wiring A2 has thin line portions A2d, A2a, and A2c each having a line width W, and a thick line portion A2b having a line width W2b. The thin line portions A2d, A2a, and A2c are routed along the land portion R1 and the thin line portions A1d, A1a, and A1c. The thick line portion A2b is routed along the thick line portion A1b. The line width can have a relationship expressed by W2b>W1b.

Similarly, as shown in FIG. 3, a coil wiring A3 as third looping is routed from an end of the thick line portion A2b close to the second short side portion 2d. A coil wiring A4 as fourth looping is routed from an end of the coil wiring A3. A coil wiring A5 as fifth looping is routed from an end of the coil wiring A4.

The respective wiring configurations of the coil wirings A3, A4, and A5 are as follows. Specifically, the coil wiring A3 is formed of thin line portions A3d, A3a, and A3c (see FIG. 4) and an L-shaped thick line portion A3b (see FIG. 3). The coil wiring A4 is formed of thin line portions A4d, A4a, and A4c (see FIG. 4) and an L-shaped thick line portion A4b (see FIG. 3). The coil wiring A5 is formed of thin line portions A5d, A5a, and A5c (see FIG. 4) and a thick line portion A5b (see FIG. 3).

Each thin line portion in the coil wirings A3, A4, and A5 has a line width W.

All of the thick line portions A3$b$, A4$b$, and A5$b$ have a common line width W3$b$. The line widths can have a relationship expressed by W1$b$<W3$b$<W2$b$.

The thick line portion A3$b$ is routed parallel to the thick line portion A2$b$ extending in the x direction, bent at the end of the thick line portion A2$b$ near the second short side portion 2$d$, and extended along the y direction of the thick line portion A2$b$.

The thick line portion A4$b$ is disposed parallel to the thick line portion A3$b$ extending in the x direction, bent at the end of the thick line portion A3$b$ near the second short side portion 2$d$, and extended along the y direction of the thick line portion A3$b$.

Each thin line portion favorably has a line width W of not less than 0.1 mm and less than 1 mm. As an example, the line width W is 0.4 mm in the first embodiment.

The thick line portion A1$b$ has a line width W1$b$ which is set to be not less than 1 mm but not to allow the thick line portion A1$b$ to overlap with the first embossed area 5. Thus, the thick line portion A1$b$ is extended along the boundary 5$a$ of the first embossed area 5, while being positioned outside the range of the first embossed area 5 (see FIG. 1).

As shown in FIG. 1, in the first embodiment, the thick line portion A2$b$ is formed at a position that overlaps with the first embossed area 5. The line width W2$b$ of the thick line portion A2$b$ is substantially the same (or the same) as the width of the first embossed area 5 in the y direction, and is made larger than the y-direction width of the characters formed in the first embossed area 5. This eliminates the risk of breaking the thick line portion A2$b$ when an embossed portion is formed in the first embossed area 5.

The line width W3$b$ of each of the thick line portions A3$b$, A4$b$, and A5$b$ is made larger than the y-direction width of the characters in each row formed in the second embossed area 6. This eliminates the risk of breaking the thick line portions A3$b$, A4$b$, and A5$b$ when an embossed part is formed in the second embossed area 6.

As shown in FIG. 4, a line width transition portion Atc is provided between an end of the thick line portion A1$b$ and an end of the thin line portion A1$c$ to allow a line width to gradually change from W to W1$b$. Similarly, a line width transition portion Atd is provided between an end of the thick line portion A1$b$ and an end of the thin line portion A2$d$ to allow a line width to gradually change from W1$b$ to W.

The shapes of the line width transition portions Atc and Atd are set such that line widths Wc and Wd along an extension line Lb of the second side surface portion 22$b$ are equal to or more than 1 mm, respectively, so as to improve durability against bending.

In the first embodiment, the line width transition portion Atc has a line width that gradually increases from the end of the thin line portion A1$c$ outwardly from the first hole portion 22. At the corner portion along a rounded corner of the first hole portion 22, the line width of the line width transition portion Atc has a maximum value Wr (the line width can be Wr≥W1$b$). In this way, the line width transition portion Atc is provided to have a shape for smoothly establishing connection with the straight portion of the thick line portion A1$b$ having the line width W1$b$. As a specific example, the dimension can be W=0.4 (mm), Wr=1.6 (mm), W1$b$=0.5 (mm), and Wc=2.6 (mm).

The thick line portion A1$b$ connected to the line width transition portion Atd is bent along the rounded corner of the first hole portion 22 while maintaining the line width W1$b$. As the thick line portion A1$b$ extends in a diagonal direction along the land portion R1, the line width of the thick line portion A1$b$ gradually decreases to the line width W. The line portion that has reduced the line width in this way is provided to have a shape for smoothly establishing connection with the end of the thin line portion A2$d$ that is arcuately routed along the outer side of the land portion R1 close to the second short side portion 2$d$. As specific example, the dimension according to such a shape can be Wd=2.6 (mm).

With this configuration, the inductance of the coupling coil portion 4A is calculated as the inductance of a coil that has a spiral (volute) wiring pattern made by concatenating the center lines of the line widths of the coil wirings A1, A2, A3, A4, and A5. Accordingly, the path made by concatenating the center lines of the line widths of the coil wirings A1, A2, A3, A4, and A5 coincides with a coil wiring path that defines the inductance of the coupling coil portion 4A.

As described above, the coupling coil portion 4A is arranged outside the IC module accommodating portion 21. The reason for this is to prevent the wiring from being located immediately below a corner portion where stress concentration occurs when an external force acts on the dual IC card 1 to bend the card. For example, the corner portion corresponds to a portion where the first, second, third, or fourth side surface portion 22$a$, 22$b$, 22$c$ or 22$d$ intersects the bottom surface of the first hole portion 22 (see the two-dot chain line of FIG. 4).

The coil wiring A1 that extends along the second side surface portion 22$b$ is the thick line portion A1$b$ having a line width of not less than 1 mm. The reason for this is to improve durability of the coil wiring A1 against the stress concentrated on a corner portion formed by the second side surface portion 22$b$. Such a stress is caused in the case where the antenna 4 or the IC module accommodating portion 21 is displaced by fabrication variations to allow the coil wiring A1 to overlap with the corner portion in question, followed by bending along the y direction.

The line width transition portions Atc and Atd are provided in portions overlapping and intersecting the extension line Lb of the second side surface portion 22$b$, and the line widths Wc and Wd overlapping with the extension line Lb are rendered to be not less than 1 mm. The reason for this is to prevent breakage of the coil wiring A1 caused by a high stress field on the extension line of the corner portion formed by the second side surface portion 22$b$.

As shown in FIG. 3, the main coil portion 4B in the first embodiment forms a coil opening in an area adjacent to the IC module 3, so as to perform reception/transmission in contactless communication with an external machine and receive power supply from the external machine. The main coil portion 4B is connected to an end of the thick line portion A5$b$ of the coupling coil portion 4A, the end being close to the second short side portion 2$d$. In the first embodiment, the main coil portion 4B, as a whole, is configured by a wiring looped three times and having different line widths depending on the location of the wiring. Similar to the main coil portion 4B, the wiring of the main coil portion 4B is formed by patterning a metal layer having a thickness T by etching or the like.

The main coil portion 4B has an outermost wiring that is a coil wiring B3 configuring third looping. The coil wiring B3 is formed of a thick line portion B3$b$ having a line width W3$b$ and routed in the x direction at a position contiguous with the second long side portion 2$b$, a thick line portion B3$d$ having a line width W3$d$ and routed in the y direction at a position contiguous with the second short side portion 2$d$ (W<W3$d$<W3$b$), a resistance-increasing portion B3$a$ routed in the x direction at a position contiguous with the first long side portion 2a, and a thick line portion B3c routed in the y direction at a position contiguous with the coupling coil portion 4A.

The line width of the thick line portion B3c located close to the first long side portion 2a is W3d which is equal to the line width of the thick line portion B3d. The thick line portion B3c has a portion parallel to the thick line portion A4b of the coupling coil portion 4A and having a line width which is increased so as to be equal to W3b of the thick line portion A4b.

The resistance-increasing portion B3a, the shape of which is shown in detail in FIG. 5A, is a wiring portion (resistance wiring portion) that has a rectangular wave-like wiring pattern formed in a range of ±ha between a point P1 (first point) and a point P2 (second point) (section) along a straight line O (direct connection, see the imaginary line) extending in the x direction.

The resistance-increasing portion B3a has a line width of a constant value Wa (Wa<W). FIG. 5B shows a wiring pattern made by concatenating the center line of the line width. As shown in FIG. 5B, a wavelength along the straight line O is da. Accordingly, the wiring pattern of the resistance-increasing portion B3a has amplitude expressed by ha−Wa/2.

The line width Wa is set to an appropriate value equal to or more than a lower limit value of the line width which is suitable for stably fabricating an etched antenna by means of a gravure plate resist printing method used for generally used dual IC cards. Also, this setting of the line width Wa is necessary for imparting durability to the dual IC card 1 when an external force is applied to the card.

In the electromagnetic coupling-type dual IC card, the line width Wa is preferably small so as to increase the electrical resistance and decrease the Q value in a limited antenna shape. For example, the line width W of each thin line portion is preferably not less than 0.1 mm but not more than 1 mm, and a dimension of about 0.4 mm is particularly preferable.

In contrast, the line width in the resistance-increasing portion B3a is preferably equal to or less than the line width W of each thin line portion, and the line width of not more than 0.4 mm is particularly preferable. More preferably, the line width in the resistance-increasing portion B3a is less than the line width W of each thin line portion, and particularly less than 0.4 mm.

According to the resistance-increasing portion B3a that has such a wiring pattern, the wiring path of the resistance wiring portion is provided to extend along a rectangular wave that generates oscillation centering on the straight line O (direct connection), in the section between the point P1 (first point) and the point P2 (second point). Accordingly, the pattern of the wiring configuring the resistance-increasing portion B3a has a first bent pattern that intersects the direct connection a plurality of times.

Accordingly, in wiring portions extending in the y direction, currents are passed in different directions in the mutually adjacent wiring portions, causing mutual cancellation of magnetic fields. Accordingly, the mutually adjacent wiring portions do not contribute to the inductance.

In wiring portions extending in the x direction, wiring portions L1 at a location of decreasing an opening area of the coil wiring B3 are alternated with wiring portions L2 at a location of increasing the opening area of the coil wiring B3. The sum of a decrease S2 and an increase S1 of an opening area is ensured to be zero.

Consequently, the opening area that defines the inductance of the coil wiring B3 is determined by the coil wiring path made by concatenating the center lines of the line widths of the thick line portions B3b and B3d, the straight line O, and the center lines of the line widths of the thick line portion B3c. Accordingly, the inductance caused by the coil wiring B3 is equivalent to the inductance of a coil wiring calculated when a linear wiring along the straight line O is arranged in place of the resistance-increasing portion B3a.

In contrast, a line length $L_{B3a}$, which is a length measured along the center of the line width in the resistance-increasing portion B3a, is expressed by the following Expression (1) when a length of the resistance-increasing portion B3a along the straight line O (length between the points P1 and P2) is taken as $L_O$ and the number of rectangular waves is taken as N:

$$L_{B3a} = L_O + 4 \cdot N \cdot (ha - Wa/2) \qquad (1)$$

Let us discuss herein a coil wiring that has an inductance equal to that of the resistance-increasing portion B3a of the coil wiring B3 (hereinafter referred to as an equivalent coil wiring B3'). The equivalent coil wiring B3' having the same cross-sectional area as that of the wiring of the resistance-increasing portion B3a is formed of the same material as that of the resistance-increasing portion B3a and has a length $L_O$. In this case, the electrical resistance of the coil wiring B3 increases proportionately with the increase of the line length of the resistance-increasing portion B3a ($L_{B3a} - L_O$), compared to the electrical resistance of the equivalent coil wiring B3'.

In other words, by allowing the coil wiring B3 to have the resistance-increasing portion B3a, the electrical resistance of the coil wiring B3 is increased without changing the inductance of the equivalent coil wiring B3'. Accordingly, the resistance-increasing portion B3a is provided, between the points P1 and P2, with a resistance wiring portion having a line length larger than that of the direct connection (straight line O) that hypothetically link the points P1 and P2 defining the section, having the same cross-sectional area as that of the direct connection, and formed of the same material as that of the direct connection. The electrical resistance of the resistance wiring portion provided in this section is higher than the electrical resistance in the case where the direct connection is provided in this section.

The electrical resistance of the resistance-increasing portion B3a is set to a value necessary for obtaining a preferable value in the electrical resistance of the resonant circuit caused by the antenna 4. Particularly, the electrical resistance of the resistance-increasing portion B3a is preferably set such that the Q value of the antenna 4 becomes a proper value.

The electrical resistance of the resistance-increasing portion B3a is preferably set to be higher by a factor of two or more than the electrical resistance of the wiring (direct connection) positioned between both ends of the resistance-increasing portion B3a to extend along the coil wiring path, having the same cross-sectional area as that of the wiring of the resistance-increasing portion B3a, and formed of the same material as that of the resistance-increasing portion B3a. In the first embodiment, the electrical resistance of the resistance-increasing portion B3a is preferably set to be higher by a factor of two or more than the electrical resistance of the linear wiring formed of the material mentioned above and having the cross-sectional area and length $L_O$ mentioned above.

In other words, the electrical resistance of the resistance wiring portion of the resistance-increasing portion B3a is preferably higher by a factor of two or more than the electrical resistance in the case where the direct connection is provided in the section between the points P1 and P2.

The main coil portion 4B has a coil wiring B2 that configures second looping. The coil wiring B2 is routed along the inner side of the coil wiring B3 from the end of the thick line portion B3c, the end being close to the second long side portion 2b. The coil wiring B2 is formed of a thick line portion B2b having a line width W3b and extending along the thick line portion B3b, a lateral wiring portion B2d extending along the thick line portion B3d, a thin line portion B2a having a line width W and extending along the resistance-increasing portion B3a, and a lateral wiring portion B2c extending along the thick line portion B3c.

The lateral wiring portions B2d and B2c parallel to the thick line portion A4b of the coupling coil portion 4A and close to the second long side portion 2b include portions each having a line width W3b. The lateral wiring portions B2d and B2c close to the first long side portion 2a include portions each having a line width W. The portions having different line widths in this way are mutually linked via an intermediate wiring portion that has a wiring width of not less than the line width W.

In the first embodiment, these intermediate wiring portions are formed at positions closer to the first long side portion 2a than to the extension line Lb of the second side surface portion 22b. Accordingly, the intermediate wiring portions can both have the line width W3b on the extension line Lb.

The main coil portion 4B has a coil wiring B1 that configures first looping. The coil wiring B1 is routed along the inner side of the coil wiring B2 from the end of the lateral wiring portion B2c, the end being close to the second long side portion 2b. The coil wiring B1 is formed of a thick line portion B1b having a line width W3b and extending along the thick line portion B2b, a lateral wiring portion B1d extending along the lateral wiring portion B2d, a thin line portion B1a having a line width W and extending along the thin line portion B2a, and a thin line portion B1c having a width W and extending along the lateral wiring portion B2c.

The lateral wiring portion B1d parallel to the thick line portion A4b of the coupling coil portion 4A and close to the second long side portion 2b includes a portion having a line width W3b. The lateral wiring portion B1d close to the first long side portion 2a includes a portion having a line width W.

The portions having different line widths in this way are mutually linked via an intermediate wiring portion that has a wiring width of not less than the line width W.

In the first embodiment, the intermediate wiring portions are formed at positions closer to the first long side portion 2a than to the extension line Lb of the second side surface portion 22b. Accordingly, the intermediate wiring portions can both have a line width W3b on the extension line Lb.

The thin line portion B1c extends halfway of the lateral wiring portion B2c having a line width W and terminates. This termination portion is electrically connected to the capacitive element 42 via a wiring Ta.

With this configuration, the inductance of the main coil portion 4B is calculated as the inductance of a coil having a spiral wiring pattern corresponding to the concatenation of the center lines of the line widths of the coil wirings B1 and B2 and the equivalent coil wiring B3'. Accordingly, the path that is the concatenation of the center lines of the line widths of the coil wirings B1 and B2 and the equivalent coil wiring B3' configures a coil wiring path that defines the inductance of the main coil portion 4B.

The capacitive element 42 is a circuit element forming a capacitance that determines the resonance frequency of the antenna 4 to perform contactless communication. The capacitive element 42 according to the first embodiment is configured by a first electrode 42a in a rectangular shape and provided to the front surface of the sheet substrate 41 where the coupling coil portion 4A and the main coil portion 4B are formed, and a second electrode 42b in a rectangular shape and provided on the back surface side of the sheet substrate 41 so as to be located at a position opposed to the first electrode 42a.

The first electrode 42a is electrically connected to the innermost end of the main coil portion 4B via the wiring Ta.

The second electrode 42b is electrically connected to the land portion R2 via a wiring Tb.

As mentioned above, since the land portion R2 is electrically continuous to the land portion R1, the second electrode 42b is electrically connected to the innermost end of the coupling coil portion 4A.

With this configuration, the antenna 4 configures a closed circuit in which the coupling coil portion 4A, the main coil portion 4B, and the capacitive element 42 are serially connected.

To fabricate the antenna 4 having such a configuration, the sheet substrate 41 made of an insulative sheet of polyethylene terephthalate (PET), polyethylene naphthalate (PEN), or the like, for example, is prepared first. Then, a metal layer, such as a copper or aluminum foil, for example, is formed on the front and back surfaces of the sheet substrate 41 by laminating processing or the like, for example. Then, the metal layer is patterned by etching or the like, for example, to thereby form a wiring pattern in the antenna 4. The antenna 4 is fabricated in this way.

The sheet substrate 41 preferably has a thickness of 15 μm to 50 μm.

The thickness T of the metal layer is preferably 5 μm to 50 μm, and more preferably 5 μm to 20 μm. As an example of the structure of the antenna 4, the following configuration can be used. Specifically, in the configuration, for example, a PET film having a thickness of 38 μm is used as the sheet substrate 41, the front surface of the sheet substrate 41 where the coupling coil portion 4A, the main coil portion 4B, the first electrode 42a, and the like are formed is provided with a lamination of an aluminum foil (aluminum layer) having a thickness of 10 μm (thickness of not more than 30 μm), and the base laminated with the aluminum foil is etched to form the wiring pattern described above. Alternatively, the following configuration can also be used. Specifically, in the configuration, the surface on the opposite side of the front surface, i.e. the back surface of the sheet substrate 41, where the second electrode 42b, the wiring Tb, and the like are formed, is provided with a lamination of an aluminum foil (aluminum layer) having a thickness of 30 μm, and the base laminated with the aluminum foil is etched to form the wiring pattern described above.

To fabricate the dual IC card 1 having the above-described configuration, the IC module 3 and the antenna 4 are individually fabricated first. Then, the antenna 4 is sandwiched between synthetic resin sheets for forming the card body 2, and processing such as hot-press laminating or bonding processing, is performed to integrate the antenna 4 and the synthetic resin sheets.

Then, the sheet integrated in this way is punched into a shape of a card body 2.

Then, the front surface 2e of the card body 2 is subjected to milling processing, for example, to form the IC module accommodating portion 21.

Then, for example, an adhesive such as a hot-melt sheet and the IC module 3 are arranged in the IC module accommodating portion 21 to bond the IC module 3 in the IC module accommodating portion 21.

When forming an embossed portion, such as character strings or the like, in the first and second embossed areas 5 and 6, embossing-process is further performed. In this case, portions overlapping with the first and second embossed areas 5 and 6 in the coupling coil portion 4A and the main coil portion 4B each include a wiring whose line width is made larger than the height of the character strings. Therefore, if a stress is imposed on the wiring during the embossing-process, the wiring is not broken.

In this way, the dual IC card 1 is fabricated.

Next, an operation of the dual IC card 1 will be described.

In fabricating the dual IC card 1, a setup for contactless communication is performed first. Specifically, a resonance frequency is set so as to satisfy the characteristics of the IC chip 33 to be used and the communication characteristics defined by the standards or the like, and an inductance of the antenna 4 and a capacitance of the capacitive element 42 are determined.

Then, a wiring pattern of the antenna 4 is designed on the basis of the shape, layout position, or the like of the IC module 3 so as to be accommodated in a space of the card body 2.

The antenna 4 of the dual IC card 1 is not directly connected to the IC chip 33. Accordingly, a load of the resonant circuit becomes smaller than that in the case where the antenna is directly connected to the IC chip 33. Thus, the high Q value of the resonant circuit is increased in the dual IC card 1 as a whole.

On the other hand, an excessively large Q value creates an excessively narrow resonance band. Therefore, if a resonance frequency varies due to fabrication errors of the antenna 4, for example, there is a concern that communication quality is impaired.

Accordingly, to optimize the Q value of the antenna 4, an appropriate electrical resistance is required to be set in the antenna 4.

To increase the resistance of the antenna 4, a method of increasing the length of the wiring, or a method of decreasing the cross-sectional area of the wiring may be used.

However, when the number of times with which the coil is looped is increased to thereby increase the length of the wiring, the inductance is also varied. Therefore, desired communication characteristics can no longer be obtained. Further, the electrical resistance can be changed only on the looped-number-of-times basis. Therefore, it is difficult to finely adjust the resistance.

The line width of the wiring in an area overlapping with the first or second embossed area 5 or 6 cannot be decreased. Therefore, there is a limitation in increasing the number of times with which the coil is looped.

If the cross-sectional area of the wiring is decreased, strength against an external force is also decreased. This raises a problem that disconnection easily occurs in the process of fabricating the card or in using the card.

In the first embodiment, the card includes the resistance-increasing portion B3*a*. Therefore, the electrical resistance can be increased by appropriately setting the wiring pattern of the resistance-increasing portion B3*a* and changing the line length.

Specifically, the equivalent coil wiring B3' is used in place of the coil wiring B3 to design a wiring pattern and calculate an inductance or a Q value. If the Q value is excessively large, an electrical resistance to be increased is calculated, and a line length of the resistance-increasing portion B3*a* corresponding to the increase of the electrical resistance is calculated. Then, a rectangular wave-like wiring pattern for realizing the line length is calculated.

In this case, since the inductance is the same as that of the equivalent coil wiring B3', the need to redesign the resonant circuit is eliminated, and an efficient designing can be realized.

In this way, the dual IC card 1 of the first embodiment can realize a configuration that achieves a resonant circuit having a small Q value while the IC module 3 is electromagnetically coupled to the antenna 4. Accordingly, stable communication quality can be obtained.

In addition, since designing is facilitated, time and cost involved in designing can be reduced.

First Modification

A dual IC card according to a first modification of the first embodiment will now be described.

Figure 6:
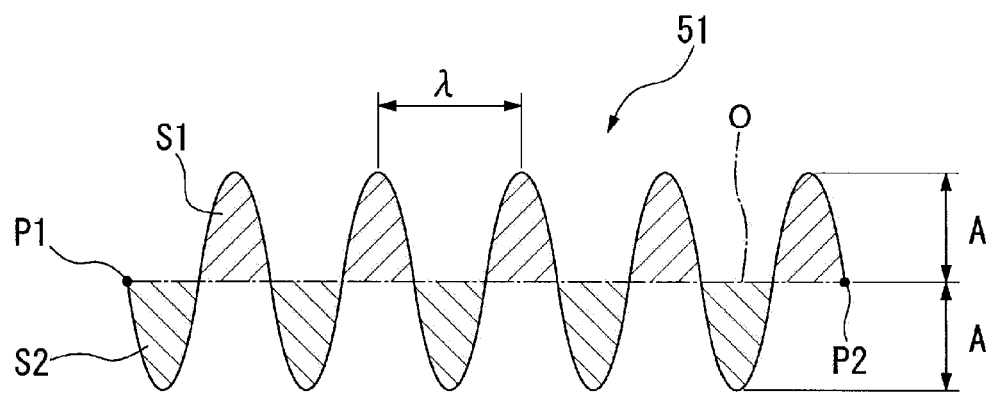
FIG. 6 is a schematic diagram illustrating a wiring pattern of a resistance-increasing portion in a dual IC card according to a first modification of the first embodiment of the present invention.

FIG. 6 is a schematic diagram of a wiring pattern illustrating a resistance-increasing portion in the dual IC card according to the first modification of the first embodiment of the present invention. Since FIG. 6 is a schematic diagram, the line width of the wiring is not shown, but only the center line of the line width is shown by the solid line (the same applies to FIGS. 7 to 10 below).

As shown in FIG. 1, a dual IC card 1A according to the present modification includes a resistance-increasing portion 51 (first bent pattern) in place of the resistance-increasing portion B3*a* of the dual IC card 1 according to the first embodiment.

The following description is focused on the configurations different from those of the first embodiment. In the present modification, components identical with or equivalent to those of the first embodiment are designated with identical reference signs to omit common description.

As shown in FIG. 6, the resistance-increasing portion 51 is a wiring portion having a wiring pattern of a sinusoidal wave. The sinusoidal wave oscillates centering on the straight line O formed between the points P1 and P2 and has an amplitude A, a wavelength k, and a line width Wa (not shown in FIG. 6). In the wiring pattern, the sinusoidal wave continues by an integral multiple of the wavelength $\lambda$.

Although FIG. 6 exemplifies the case of five waves as an example, the wiring pattern of the resistance-increasing portion 51 is not limited to the case of FIG. 6. The number of waves, the amplitude A (A<ha−Wa/2), the wavelength k, and the line width Wa can be set in accordance with an electrical resistance value necessary for the antenna 4.

The line length of the resistance-increasing portion 51 can be calculated by a line integral of a function representing the sinusoidal wave.

According to the resistance-increasing portion 51, as in the resistance-increasing portion B3*a* according to the first embodiment, the sum of the opening area decrease S2 and the opening area increase S1 in the coil wiring B3 is ensured to be zero. Accordingly, the inductance of the coil wiring B3 in the present modification does not differ from the inductance of the equivalent coil wiring B3'. On the other hand, since the line length of the resistance-increasing portion 51 is longer than the distance $L_O$, only the electrical resistance is increased.

Second Modification

A dual IC card according to a second modification of the first embodiment will now be described.

Figure 7:
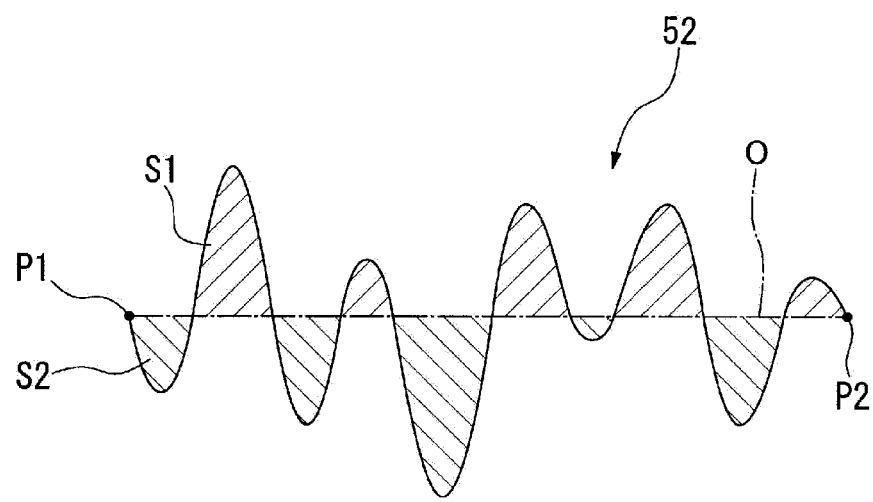
FIG. 7 is a schematic diagram illustrating a wiring pattern of a resistance-increasing portion in a dual IC card according to a second modification of the first embodiment of the present invention.

FIG. 7 is a schematic diagram illustrating a wiring pattern of a resistance-increasing portion in a dual IC card according to the second modification of the first embodiment of the present invention.

As shown in FIG. 1, a dual IC card 1B according to the present modification includes a resistance-increasing portion 52 (first bent pattern) in place of the resistance-increasing portion B3a of the dual IC card 1 according to the first embodiment.

The following description is focused on the configurations different from those of the first embodiment. In the present modification, components identical with or equivalent to those of the first embodiment are designated with identical reference signs to omit common description.

As shown in FIG. 7, the resistance-increasing portion 52 is a synthetic wave in which a plurality of sinusoidal waves are superimposed centering on the straight line O formed between the points P1 and P2. Similar to the resistance-increasing portion B3a, the resistance-increasing portion 52 is a wiring pattern in which the sum of the opening area decrease S2 and the opening area increase 51 in the coil wiring B3 is ensured to be zero.

The amplitudes, waves, and phases of the sinusoidal waves to be superimposed are not particularly limited, and the number of sinusoidal waves to be superimposed is not particularly limited either.

The line length of the resistance-increasing portion 52 can be calculated by a line integral of a function representing the waveform.

According to the resistance-increasing portion 52, similar to the resistance-increasing portion B3a according to the first embodiment, the sum of the opening area decrease S2 and the opening area increase 51 in the coil wiring B3 is ensured to be zero. Accordingly, the inductance of the coil wiring B3 in the present modification does not differ from the inductance of the equivalent coil wiring B3'. On the other hand, since the line length of the resistance-increasing portion 52 is longer than the distance $L_O$, only the electrical resistance is increased.

Third Modification

A dual IC card according to a third modification of the first embodiment will now be described.

Figure 8:
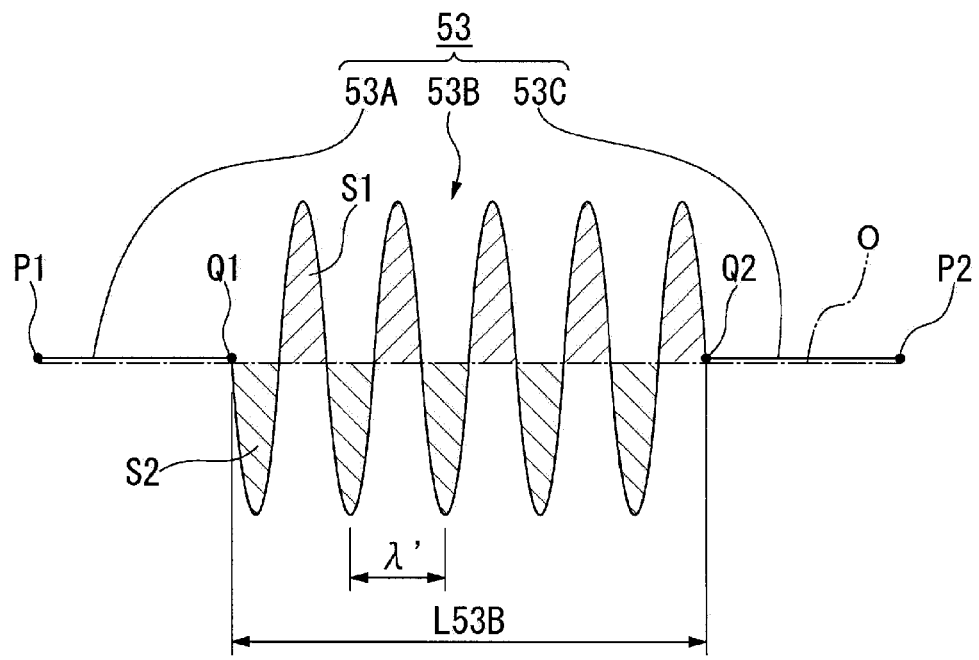
FIG. 8 is a schematic diagram illustrating a wiring pattern of a resistance-increasing portion in a dual IC card according to a third modification of the first embodiment of the present invention.

FIG. 8 is a schematic diagram illustrating a wiring pattern of a resistance-increasing portion in a dual IC card according to the third modification of the first embodiment of the present invention.

As shown in FIG. 1, a dual IC card 1C according to the present modification includes a wiring portion 53 in place of the resistance-increasing portion B3a of the dual IC card 1 according to the first embodiment.

As shown in FIG. 8, the wiring portion 53 is formed of a thin line portion 53A, a resistance-increasing portion 53B (first bent pattern), and a thin line portion 53C.

The following description is focused on the configurations different from those of the first embodiment. In the present modification, components identical with or equivalent to those of the first embodiment are designated with identical reference signs to omit common description.

The thin line portion 53A is a wiring portion having a line width Wa and formed along the straight line O from the point P1 at an end of the thick line portion B3c to a point Q1 on the straight line O located halfway of the wiring portion 53.

The resistance-increasing portion 53B is a wiring portion having a wiring pattern of a sinusoidal wave. The sinusoidal wave oscillates centering on the straight line O that links the point Q1 and a point Q2 positioned between the point Q1 and a point P2 on the straight line O, and has an amplitude A, a wavelength $\lambda'$ ($\lambda' < \lambda$), and a line width Wa (not shown in FIG. 8). In the wiring pattern, the sinusoidal wave continues by an integral multiple of the wavelength $\lambda'$.

FIG. 8 exemplifies the case of five waves as an example. However, the wiring pattern of the resistance-increasing portion 53B is not limited to this. The number of waves, the amplitude A (A≤ha−Wa/2), the wavelength $\lambda'$, and the line width Wa can be set in accordance with an electrical resistance value necessary for the antenna 4.

The line length of the resistance-increasing portion 53B can be calculated by a line integral of a function representing the sinusoidal wave.

The thin line portion 53C is a wiring portion having a line width Wa and formed along the straight line O from the point Q2 to the point P2 at an end of the thick line portion B3d.

Thus, in the resistance-increasing portion 53B of the dual IC card 1C according to the present modification, there is a change in the wavelength of the resistance-increasing portion 51 which is formed in the range of the length $L_O$ along the coil wiring path (direct connection) of the first modification. The resistance-increasing portion 53B is formed in a range of a length $L_{53B}$ along the coil wiring path, the length being equal to the distance between the points Q1 and Q2 ($L_{53B} < L_O$).

Thus, as long as a necessary increase of the electrical resistance is ensured, the resistance-increasing portion may be provided partially on a straight portion of the coil wiring path.

According to the resistance-increasing portion 53B, similar to the resistance-increasing portion 51 of the first modification, the sum of the opening area decrease S2 and the opening area increase S1 in the coil wiring B3 is ensured to be zero. Accordingly, the inductance of the coil wiring B3 in the present modification does not differ from the inductance of the equivalent coil wiring B3'. On the other hand, since the line length of the resistance-increasing portion 53B is longer than the length $L_{53B}$, only the electrical resistance is increased.

Fourth Modification

A dual IC card according to a fourth modification of the first embodiment will now be described.

Figure 9:
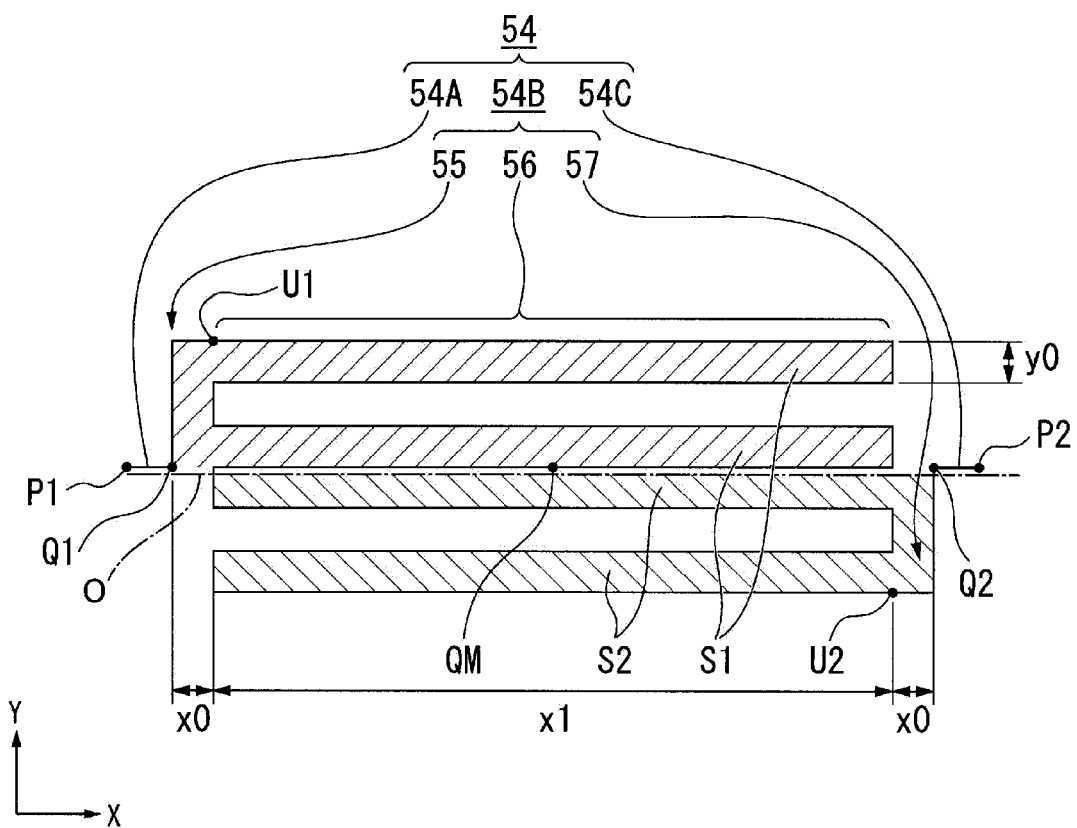
FIG. 9 is a schematic diagram illustrating a wiring pattern of a resistance-increasing portion in a dual IC card according to a fourth modification of the first embodiment of the present invention.

FIG. 9 is a schematic diagram illustrating a wiring pattern of a resistance-increasing portion in a dual IC card according to the fourth modification of the first embodiment of the present invention.

As shown in FIG. 1, a dual IC card 1D according to the present modification includes a wiring portion 53 in place of the resistance-increasing portion B3a of the dual IC card 1 according to the first embodiment.

As shown in FIG. 9, the wiring portion 54 is formed of a thin line portion 54A, a resistance-increasing portion 54B, and a thin line portion 54C.

The following description is focused on the configurations different from those of the first embodiment. In the present modification, components identical with or equivalent to those of the first embodiment are designated with identical reference signs to omit common description.

The thin line portion 54A is a wiring portion having a line width Wa and formed along the straight line O from the point P1 at an end of the thick line portion B3c to the point Q1 halfway of the wiring portion 53 on the straight line O. The position of the point Q1 may be or may not be the same as the position of the point Q1 of the third modification.

The resistance-increasing portion 54B is a wiring portion having rectangular wave-like wiring patterns meandering in directions along the straight line O by linking the point Q1 and the point Q2 positioned between the points Q1 and P2 on the straight line O.

FIG. 9 exemplifies, as an example, the case where the resistance-increasing portion 54B is formed of an end wiring 55, a meandering wiring 56 (second bent patterns), and an end wiring 57.

The end wiring 55 is an L-shaped wiring portion extending to the outer side of the coil wiring B3 along the y direction from the point Q1 by a distance 3×y0 (distance threefold of y0), further extending along the x direction toward the point Q2 (+x direction) by a distance x0, and reaching a point U1 that is an end.

The meandering wiring 56 extends along the x direction from the point U1 that is an end of the end wiring 55 (path start point) toward the point Q2 (+x direction) by a distance x1, further extends to the inner side of the coil wiring B3 along the y direction by a distance y0, returns along the x direction toward the point Q1 by the distance x1, further extends to the inner side of the coil wiring B3 along the y direction by the distance y0 (pitch y0), and reaches an end (path end point) of a single path pattern configuring the meandering wiring 56. The meandering wiring 56 is formed by repeating such a single path pattern 3.5 times (by 3.5 reciprocations) which extends from the path start point to the path end point. Thus, the meandering wiring 56 is configured to have rectangular wave patterns such as the ones in which waveforms are spaced apart at the pitch y0 in the y direction while each waveform has a width x1 along the straight line O.

In other words, in the outside of the coil wiring B3 with the straight line O inclusive, there are formed wiring patterns meandering two times along a path pattern having a y-direction spacing y0 and an x-direction distance x1, whereas in the inside of the coil wiring B3 with the straight line O exclusive, there are formed wiring patterns meandering 1.5 times along a path pattern having the y-direction spacing y0 and the x-direction distance x1.

The meandering wiring 56 is extended from the point U1 to a point U2. Herein, the point U2 is spaced apart from the point Q1 by x0+x1 in the x direction, and spaced apart from the straight line O toward the inner side of the coil wiring B3 by a distance 3×y0.

The end wiring 57 is an L-shaped wiring portion extending along the x direction from the point U2 toward the point Q2 (+x direction) by a distance x0, and extending along the y direction toward the outer side of the coil wiring B3 by a distance 3×y0.

With this configuration, the resistance-increasing portion 54B configures wiring patterns that are 180° rotationally symmetric about a midpoint QM of a line segment Q1-Q2 on the straight line O. In the meandering wiring 56, the sum of the opening area increase and decrease S1 and S2 of the coil wiring B3 is ensured to be zero.

The thin line portion 54C is a wiring portion having a line width Wa and formed along the straight line O from the point Q2 to the point P2 at an end of the thick line portion B3d.

In the resistance-increasing portion 54B having such a configuration, due to the symmetry of the resistance-increasing portion 54B, the sum of the opening area decrease S2 and the opening area increase S1 in the coil wiring B3 is ensured to be zero, similar to the resistance-increasing portion B3a according to the first embodiment. Accordingly, the inductance of the coil wiring B3 in the present modification does not differ from the inductance of the equivalent coil wiring B3'. On the other hand, since the line length of the resistance-increasing portion 54B is longer than the distance 2·x0+x1, only the electrical resistance is increased.

The patterns of the wiring configuring the meandering wiring 56 of the resistance-increasing portion 54B of the present modification correspond to second bent patterns which are arranged parallel to the direct connection in a multiple manner.

Fifth Modification

A dual IC card according to a fifth modification of the first embodiment will now be described.

Figure 10:
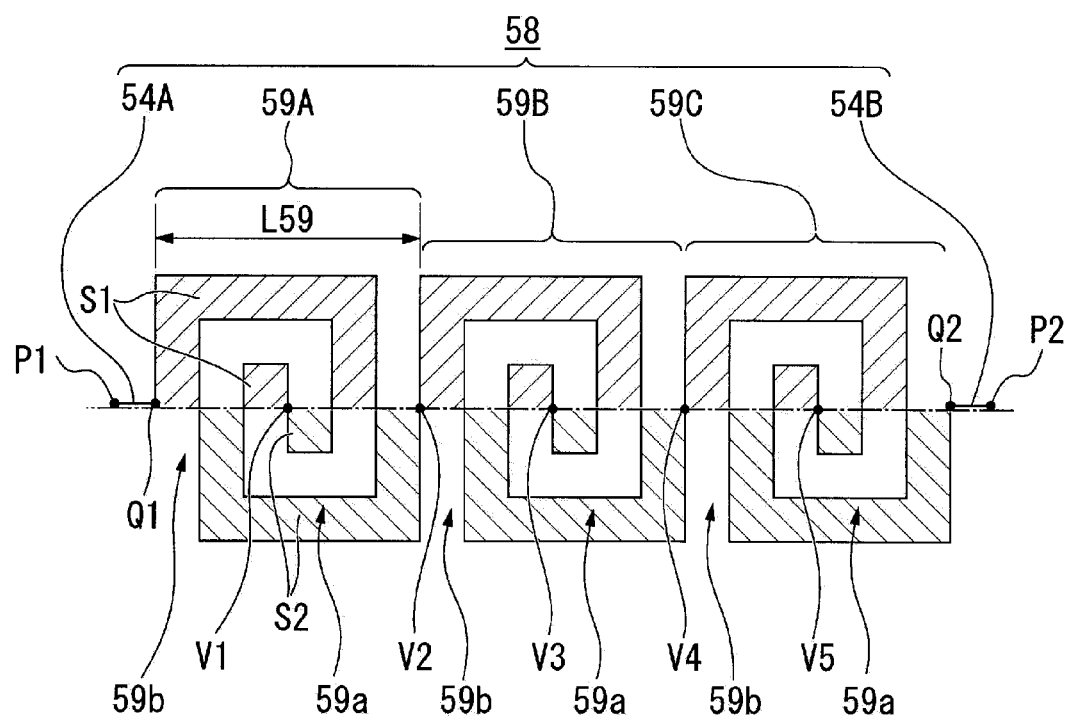
FIG. 10 is a schematic diagram illustrating a wiring pattern of a resistance-increasing portion in a dual IC card according to a fifth modification of the first embodiment of the present invention.

FIG. 10 is a schematic diagram illustrating a wiring pattern of a resistance-increasing portion in a dual IC card according to the fifth modification of the first embodiment of the present invention.

As shown in FIG. 1, a dual IC card 1E according to the present modification includes a wiring portion 58 in place of the resistance-increasing portion B3a of the dual IC card 1 according to the first embodiment.

As shown in FIG. 10, the wiring portion 58 is a wiring pattern in which the resistance-increasing portion 54B in the wiring portion 54 of the fourth variation is replaced by three resistance-increasing portions 59A, 59B, and 59C (first bent pattern).

The following description is focused on the configurations different from those of the first embodiment and the fourth modification. In the present modification, components identical with or equivalent to those of the first embodiment and the fourth modification are designated with identical reference signs to omit common description.

The resistance-increasing portion 59A is a wiring portion which is provided with a spiral wiring pattern having a line width Wa and formed of spiral wirings 59a and 59b.

The spiral wiring 59a is a wiring portion formed of an angular spiral pattern in which the wirings parallel to the x and y directions are combined and looped 1.5 times from the outer side toward the inner side of the coil wiring B3, sandwiching the straight line O. The looping is provided from the point Q1 to a point V1 positioned between the points Q1 and Q2 on the straight line O.

The volute wiring 59b is a wiring portion formed of an angular spiral pattern that is 180° rotationally symmetric about the point V1 with the spiral wiring 59a.

One end of the volute wiring 59b coincides with the point V1, and the other end of the volute wiring 59b coincides with a point V2. The point V2 is point-symmetric, on the straight line O, about the point V1 with the point Q1.

The distance L59 between the points Q1 and V2 is one-third of the distance between the points Q1 and Q2.

The resistance-increasing portion 59B corresponds to a wiring pattern provided by translating the resistance-increasing portion 59A along the straight line O by the distance L59. The resistance-increasing portion 59B has a start point V2, a symmetry center point V3, and an end point V4 which correspond to the start point Q1, the symmetry center point V1, and the end point V2 of the resistance-increasing portion 59A, respectively.

The resistance-increasing portion 59C is a wiring pattern provided by translating the resistance-increasing portion 59B along the straight line O by the distance L59, and has the start point V4, a symmetry center point V5, and the end point Q2, which correspond to the start point V2, the symmetry center point V3, and the end point V4 of the resistance-increasing portion 59B, respectively.

With this configuration, the resistance-increasing portions 59A, 59B and 59C configure wiring patterns that are 180° rotationally symmetric about the respective center symmetry points V1, V3, and V5 positioned on the straight line O. In each of the resistance-increasing portions 59A, 59B and 59C, the sum of the opening area increase and decrease S1 and S2 in the coil wiring B3 is ensured to be zero.

Each wiring pattern of the resistance-increasing portions 59A, 59B and 59C corresponds to the first bent pattern intersecting the direct connection a plurality of times.

In each of the resistance-increasing portions 59A, 59B and 59C having such a configuration, the sum of the opening area decrease S2 and the opening area increase S1 in the coil wiring B3 is ensured to be zero. Accordingly, the inductance of the coil wiring B3 in the present modification does not differ from the inductance of the equivalent coil wiring B3'. On the other hand, since the line length of each of the resistance-increasing portions 59A, 59B and 59C is longer than the distance L59, only the electrical resistance is increased.

The first embodiment and the modifications thereof described so far have dealt with the case where the resistance-increasing portion is formed in a wiring portion which is located along the first long side portion 2*a* of the outermost third looping of the main coil portion 4B. As long as the resistance-increasing portion is provided in an area (emboss-processing-prohibited area) that does not overlap with the first and second embossed areas 5 and 6, which serve as the emboss-processing-enabled areas, the resistance-increasing portion can be provided at any position on the main coil portion 4B.

In the first embodiment, an embossing-process-prohibited area is provided, extending along the first long side portion 2*a*, which is one long side, and extending from the card center, which corresponds to approximately a half position in the short side direction of the dual IC card 1, to the vicinity of the first long side portion 2*a*. Also, embossing-process-enabled areas, i.e. the first and second embossed areas 5 and 6, are provided in the vicinity of and extending along the second long side portion 2*b*, which is the other long side.

Therefore, for example, a resistance-increasing portion can be provided in place of the thin line portion B1*c*, in the embossing-process-prohibited area.

Furthermore, for example, a resistance-increasing portion can be provided partially in an area of each of the thick line portions B3*c* and B3*d*, the lateral wiring portions B2*c* and B2*d*, the thin line portion B1*c*, and the lateral wiring portion B1*d*, the area overlapping with the embossing-process-prohibited area.

However, in the case where the resistance-increasing portion is provided on the coil wiring path (direct connection) extending along and positioned in the vicinity of the first long side portion 2*a*, the resistance-increasing portion is not provided with an embossing-process-enabled area. Therefore, this case is more preferable because the length of the resistance-increasing portion can be increased and the increase of the resistance can be enhanced.

If a resistance-increasing portion is provided in a portion other than the outermost of the main coil portion, the line width of the outermost wiring is preferably set to be not less than 0.4 mm.

Figure 11A:
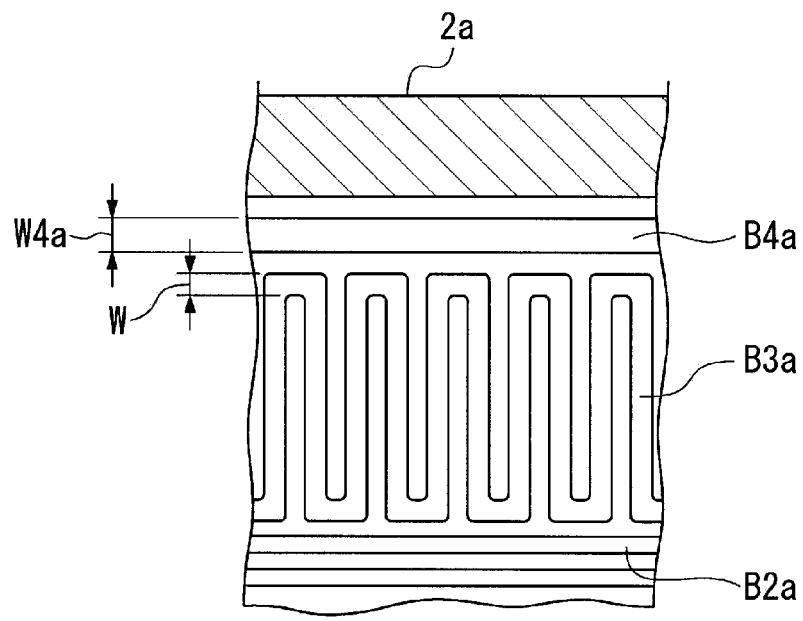
FIG. 11A is a schematic diagram illustrating a wiring pattern of a resistance-increasing portion in a dual IC card according to sixth and seventh modifications of the first embodiment of the present invention.

FIG. 11A shows a wiring pattern of a sixth modification which is an example of such a configuration.

FIG. 11A is a schematic diagram illustrating a wiring pattern of a resistance-increasing portion in a dual IC card according to the sixth modification of the first embodiment of the present invention.

As shown in FIG. 11A, in the present modification, the outermost of the main coil portion is formed of a thick line portion B4*a* having a line width W4*a* of not less than 0.4 mm, with the resistance-increasing portion B3*a* having a line width W of less than 0.4 mm being arranged on the inner side of the thick line portion B4*a*.

In the outermost of the main coil portion, which is most likely to be exposed to an etching solution in the antenna fabricating process, the coil is easily disconnected. However, according to the present modification, since the thick line portion B4*a* is provided outermost, the coil can be prevented from being disconnected in the etching process and the resistance value can be efficiently increased by the resistance-increasing portion B3*a* having a line width of less than 0.4 mm and provided on the inner side of the thick line portion B4*a*.

Similarly, the resistance value with line width can be efficiently increased in the case where a resistance-increasing portion is provided on the inner side of the coupling coil portion as will be described later.

The first embodiment and the modifications thereof describe the case where the resistance-increasing portion is formed in the main coil portion 4B. Alternatively, the resistance-increasing portion can be provided at any position on the coupling coil portion 4A as long as the resistance-increasing portion is formed in the embossing-process-prohibited area.

The above-described first embodiment and the modifications thereof describe the case where the resistance-increasing portion is formed in the embossing-process-prohibited area. However, as long as the resistance-increasing portion is formed in an area not overlapping with the embossed portion formed by embossing-process, the resistance-increasing portion can be arranged in the embossing-process-enabled area at an appropriate position on the coil wiring path (the direct connection) in the coupling coil portion 4A and the main coil portion 4B.

The first modification describes the case where the wiring pattern of the resistance-increasing portion 51 is a sinusoidal wave pattern. However, the wiring pattern of the resistance-increasing portion 51 is not limited to an exact sinusoidal wave pattern, but an appropriate wave pattern where the opening area increase 51 is equal to the opening area decrease S2 can be used. For example, wave patterns that can be used include a triangular wave pattern having pointed peaks, a sawtooth wave pattern, or a wave pattern formed by concatenating rectangular waves with rounded corners, i.e., U-shaped waves.

The first embodiment and the modifications thereof describe the case where one resistance-increasing portion is provided in the antenna 4. Alternatively, a plurality of resistance-increasing portions may be provided in the antenna 4.

When a plurality of resistance-increasing portions are provided in the antenna 4, increase of the resistance may be different between the resistance-increasing portions. In this case, the sum of the electrical resistances of the resistance-increasing portions is preferably set to be larger by a factor of two or more than the electrical resistance of a wiring having a cross-sectional area and formed of a material, which are both the same as those of the wiring (direct connection) extending along the coil wiring path.

The first embodiment and the modifications thereof describe the case where the width and cross-sectional area of the line in the resistance-increasing portion are constant. However, the width and cross-sectional area of the line in the resistance-increasing portion are not limited to be constant but may be varied along the line. In this case, the line width of the equivalent coil wiring used for calculating a preferable electrical resistance is equal to a mean value of the line widths of the resistance-increasing portion, and the cross-sectional area of the equivalent coil wiring used for calculating a preferable electrical resistance is equal to a mean value of the cross-sectional areas of the resistance-increasing portion. By using the mean value of the line widths and the mean value of the cross-sectional areas, the electrical resistance of the equivalent coil wiring is calculated.

When the line width in the resistance-increasing portion is partially changed, the line width of the outermost wiring is preferably not less than 0.4 mm.

Figure 11B:
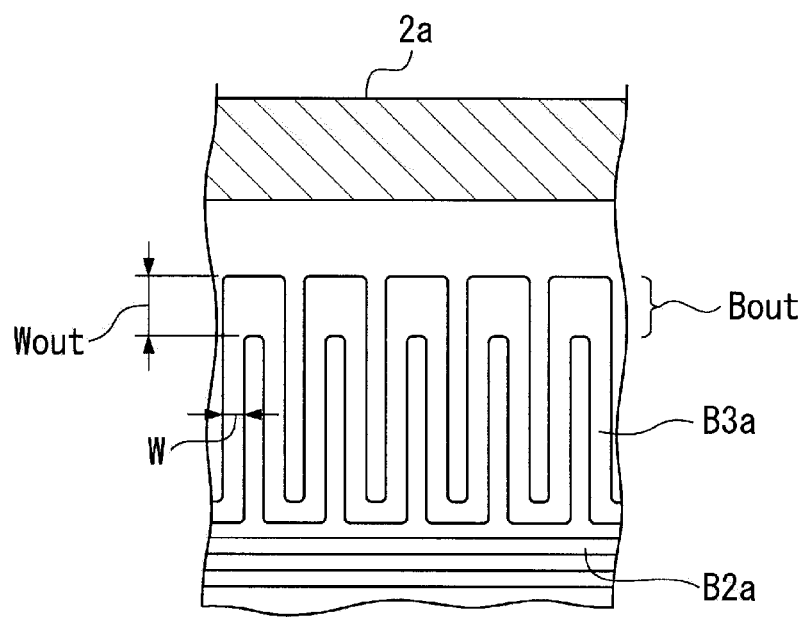
FIG. 11B is a schematic diagram illustrating a wiring pattern of a resistance-increasing portion in a dual IC card according to the sixth and seventh modifications of the first embodiment of the present invention.
Figure 12:
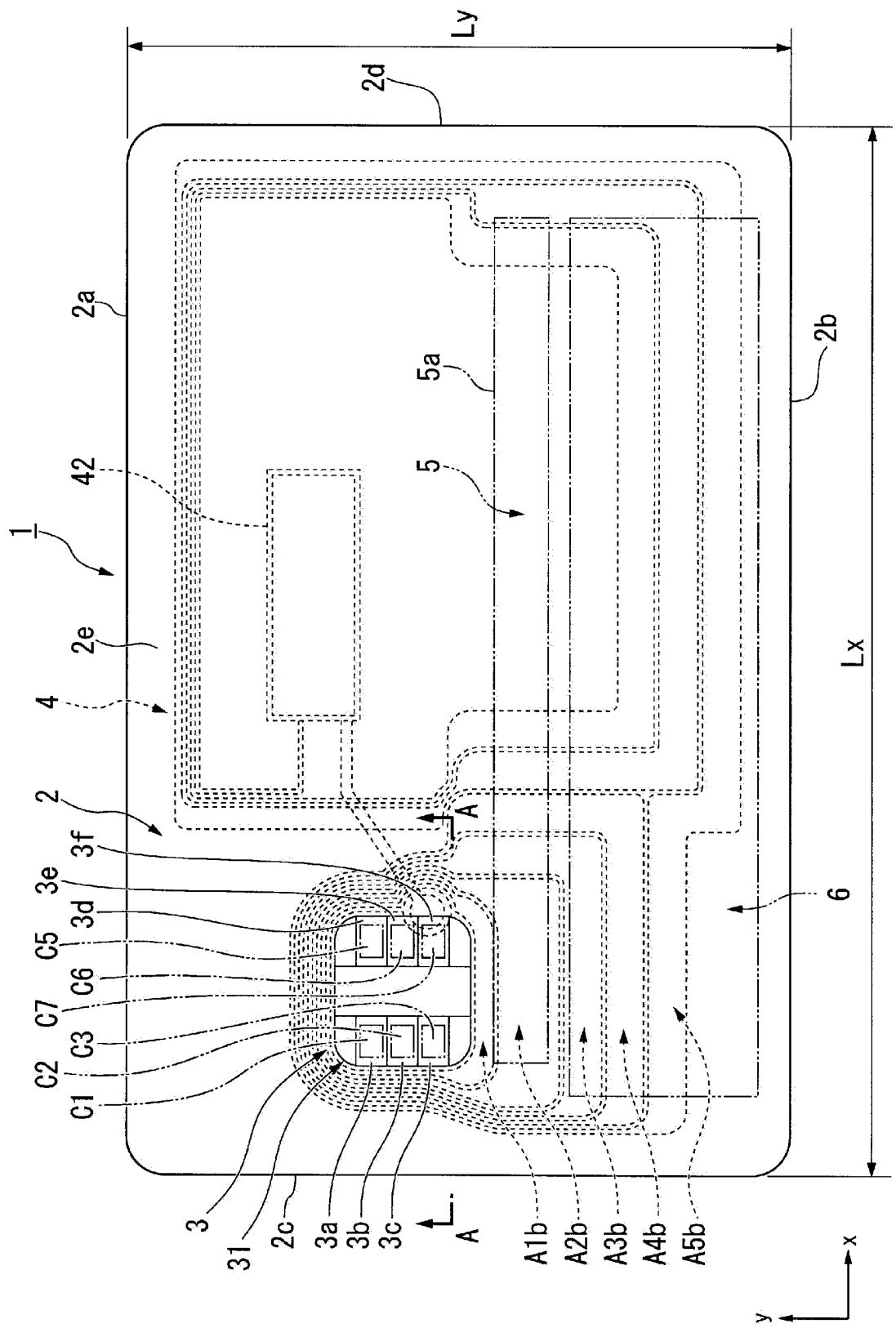
FIG. 12 is a schematic plan view illustrating a dual IC card according to a second embodiment of the present invention.

FIG. 11B shows a wiring pattern of a seventh modification which is an example of such a configuration.

FIG. 11B is a schematic diagram illustrating a wiring pattern of a resistance-increasing portion in a dual IC card according to the seventh modification of the first embodiment of the present invention.

As shown in FIG. 11B, in the present modification, a large width portion Bout having a line width Wout of not less than 0.4 mm is formed on the outermost side of the resistance-increasing portion B3a located outermost of the main coil portion. In this configuration, the resistance-increasing portion B3a positioned on the inner side relative to the large width portion Bout has a line width W less than 0.4 mm.

In an outermost of the main coil portion, which is most likely to be exposed to an etching solution in the antenna fabricating process, the coil is easily disconnected. However, according to the present modification, since the large width portion Bout is provided in the outermost periphery, the coil can be prevented from being disconnected in the etching process and the resistance value can be efficiently increased by the portion of the resistance-increasing portion B3a having the line width of less than 0.4 mm and provided on the inner side of the large width portion Bout.

The first embodiment and the modifications thereof describe the case where the line width in the resistance-increasing portion is made different from that of other coil wirings to thereby increase the electrical resistance per unit line length. Alternatively, the electrical resistance per unit line length in the resistance-increasing portion may be made equal to that of other coil wirings.

The electrical resistance per unit line length in the resistance-increasing portion can be changed by changing the cross-sectional area. Besides the line width, for example, the thickness of the wiring may be changed to ensure the increase of the electrical resistance per unit line length more than other wirings.

The first embodiment and the modifications thereof describe the case where the resistance-increasing portion is provided on the linear coil wiring path (direct connection). Alternatively, the resistance-increasing portion may be provided on a curved direct connection. For example, when the direct connection is in an arc shape, the increase and the decrease in the coil opening area caused by the resistance-increasing portion is calculated using the arc line as a boundary.

The third to fifth modifications describe the case where the resistance-increasing portion is provided halfway of the straight portion of the angular and spiral coil wiring path. Alternatively, the resistance-increasing portion may be provided at an end of the straight portion. For example, it may be so configured that the thin line portions 53A and 54A or the thin line portions 53C and 54C are removed from the third to fifth modifications.

Second Embodiment

With reference to FIGS. 12 to 14B, a second embodiment of a dual IC card according to the present invention will be described.

In FIGS. 12 to 14B, components identical with those of the first embodiment are designated with identical reference signs to omit or simplify description.

Figure 13:
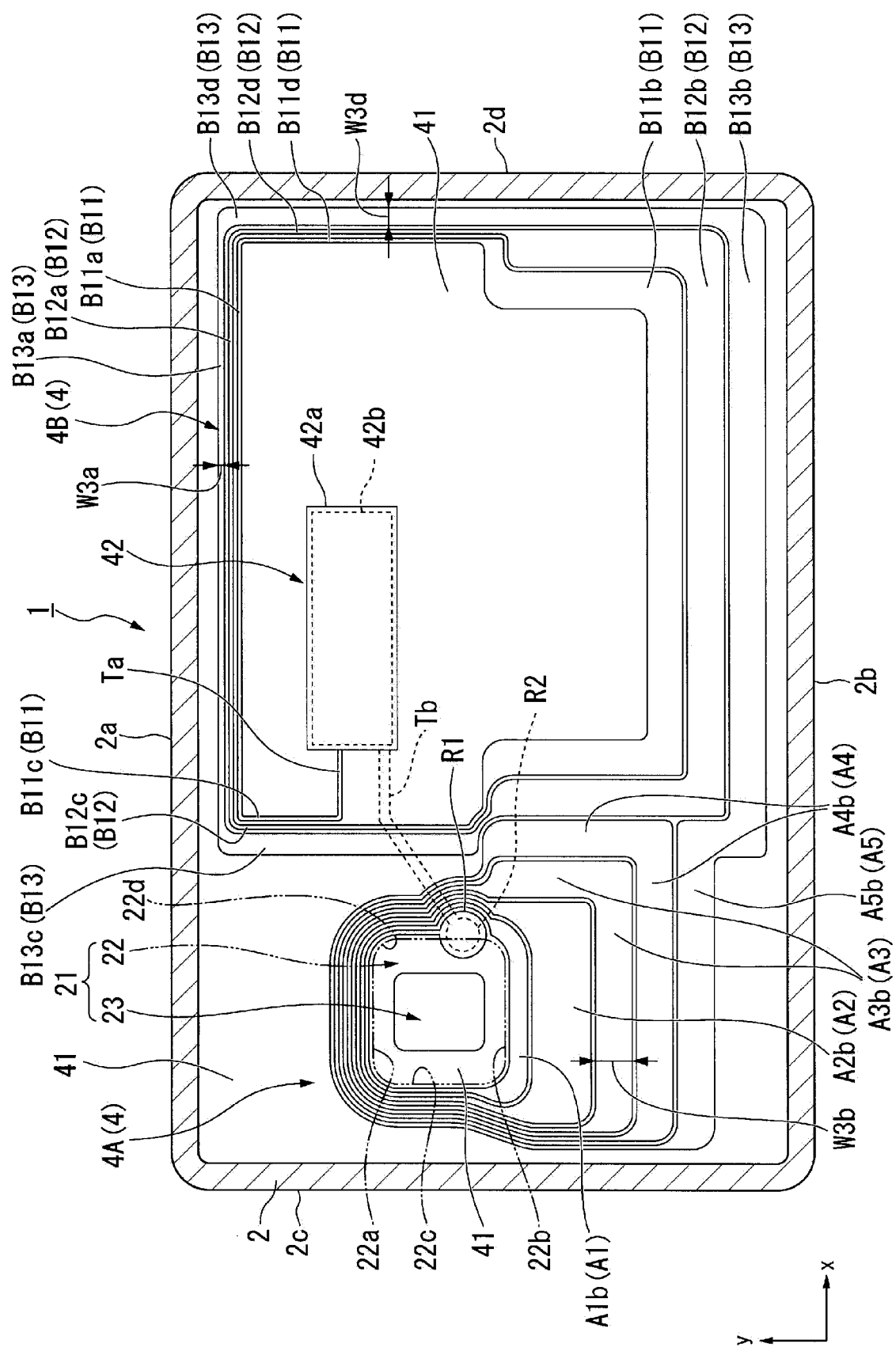
FIG. 13 is a schematic plan view illustrating an arrangement of an antenna of the dual IC card according to the second embodiment of the present invention.

As shown in FIG. 13, the main coil portion 4B in the second embodiment is forms a coil opening in an area adjacent to the IC module 3 to perform reception/transmission in contactless communication with an external machine and receive power supply from the external machine. The main coil portion 4B is connected to an end of the thick line portion A5$b$ of the coupling coil portion 4A, the end being close to the second short side portion 2$d$. In the second embodiment, the main coil portion 4B is configured by being looped three times, with the line width being made different depending on where the wiring is provided.

A coil wiring B13 that configures an outermost third looping of the main coil portion 4B is formed of a thick line portion B13$b$ having a line width W3$b$ and routed in the x direction at a position contiguous with the second long side portion 2$b$, a thick line portion B13$d$ having a line width W3$d$ (W<W3$d$<W3$b$) and routed in the y direction at a position contiguous with the second short side portion 2$d$, a thick line portion B13$a$ having a line width W3$a$ (W<W3$a$<W3$d$) and routed in the x direction at a position contiguous with the first long side portion 2$a$, and a thick line portion B13$c$ routed in the y direction at a position contiguous with the coupling coil portion 4A.

Similar to the thick line portion B13$d$, the line width W3$d$ is imparted to the thick line portion B13$c$ at a position close to the first long side portion 2$a$. Similar to the thick line portion A4$b$, an increased line width W3$b$ is imparted to a portion of the thick line portion B13$c$ parallel to the thick line portion A4$b$ of the coupling coil portion 4A.

A coil wiring B12 that configures second looping of the main coil portion 4B is routed along the inner side of the coil wiring B13 from the end of the thick line portion B13$c$ close to the second long side portion 2$b$. The coil wiring B12 is formed of a thick line portion B12$b$ having a line width W3$b$ and extending along the thick line portion B13$b$, a lateral wiring portion B12$d$ extending along the thick line portion B13$d$, a thin line portion B12$a$ having a line width W and extending along the thick line portion B13$a$, and a lateral wiring portion B12$c$ extending along the thick line portion B13$c$.

The line width W3$b$ is imparted to both of the portions of the lateral wiring portions B12$d$ and B12$c$ parallel to the thick line portion A4$b$ of the coupling coil portion 4A and close to the second long side portion 2$b$. The line width W is imparted to both of the portions of the lateral wiring portions B12$d$ and B12$c$ close to the first long side portion 2$a$. The portions having such different line widths are mutually linked via an intermediate wiring portion having a wiring width equal to or more than the line width W.

In the second embodiment, these intermediate wiring portions are formed at positions closer to the first long side portion 2$a$ than to the extension line Lb of the second side surface portion 22b. Accordingly, on the extension line Lb, the line width is W3b in all of the intermediate wiring portions.

A coil wiring B11 that configures first looping of the main coil portion 4B is routed along the inner side of the coil wiring B12 from the end of the lateral wiring portion B12c close to the second long side portion 2b. The coil wiring B11 is formed of a thick line portion B11b having a line width W3b and extending along the thick line portion B12b, a lateral wiring portion B11d extending along the lateral wiring portion B12d, a thin line portion B11a having a line width W and extending along the thin line portion B12a, and a thin line portion B11c having a width W and extending along the lateral wiring portion B12c.

A portion of the lateral wiring portion B11d parallel to the thick line portion A4b of the coupling coil portion 4A has a line width W3b. A portion of the lateral wiring portion B11d close to the first long side portion 2a has a line width W. These portions having different line widths are mutually linked via an intermediate wiring portion having a wiring width equal to or more than the line width W.

In the second embodiment, these intermediate wiring portions are formed at positions closer to the first long side portion 2a than to the extension line Lb of the second side surface portion 22b. Accordingly, on the extension line Lb, the line width is W3b in all of the intermediate wiring portions.

The thin line portion B11c extends halfway of the portion of the lateral wiring portion B12c having a line width W, and terminates. This termination portion is electrically connected to the capacitive element 42 via the wiring Ta.

The distance between the thin line portion B11a positioned close to the thick line portion B13a and the capacitive element 42 in the second embodiment is longer than the distance between the thin line portion B1a positioned close to the main coil portion 4B and the capacitive element 42 in the first embodiment. In other words, a larger area is formed between the thin line portion B11a and the capacitive element 42 in the second embodiment than in the first embodiment.

An operation of the dual IC card 1 will be described.

Figure 14A:
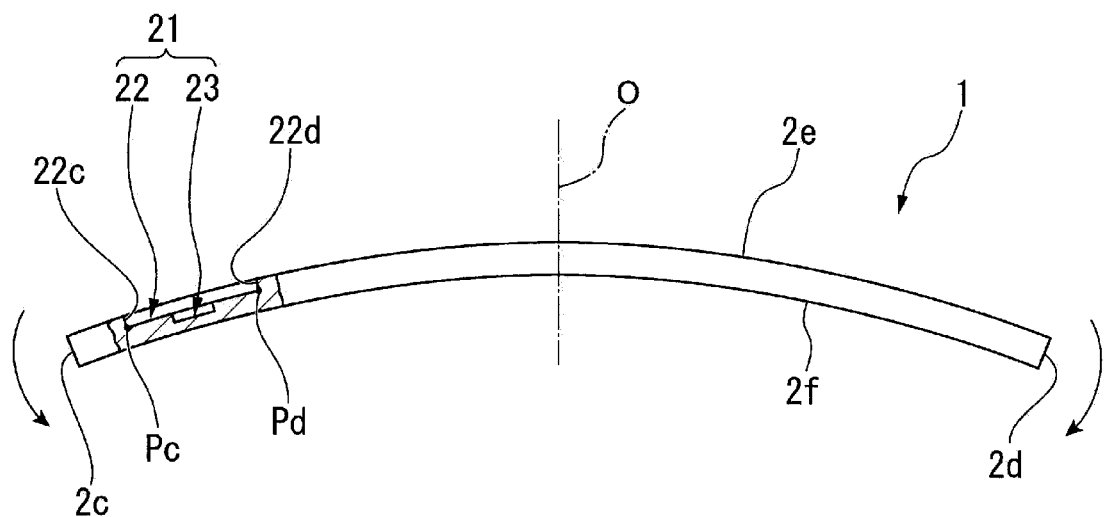
FIG. 14A is a schematic diagram illustrating a state where the dual IC card according to the second embodiment of the present invention has been bent and deformed.
Figure 14B:
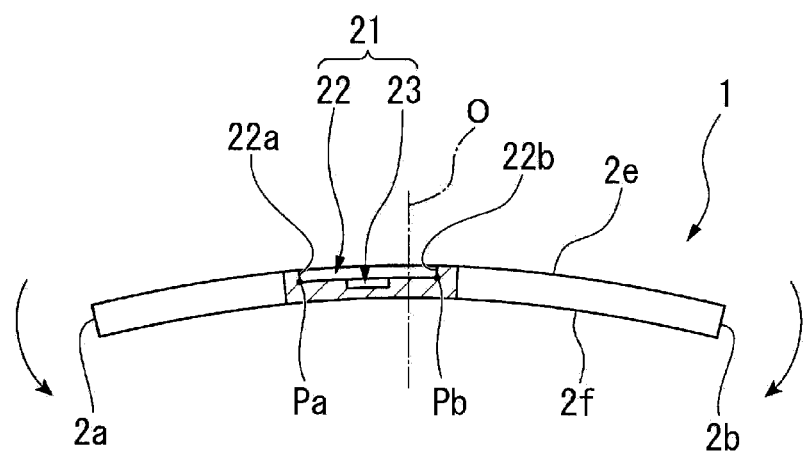
FIG. 14B is a schematic diagram illustrating a state where the dual IC card according to the second embodiment of the present invention has been bent and deformed.

FIGS. 14A and 14B are schematic diagrams each illustrating a state where the dual IC card according to the second embodiment of the present invention has been bent and deformed. Since FIGS. 14A and 14B are schematic diagrams, members other than the card body 2 are omitted.

The dual IC card 1 is formed of a rectangular thin plate and thus is deformed when receiving an external force while being used. Depending on the magnitude of an internal stress of the dual IC card 1, in wiring may be disconnected.

Particularly, since the dual IC card 1 is provided with the IC module accommodating portion 21 that is a recess for embedding the IC module 3, a stress concentration occurs in a portion where the thickness of the card body 2 drastically changes.

For example, as shown in FIG. 14A, if the dual IC card 1 is bent in a longitudinal direction, the dual IC card 1 as a whole is curved and a bending stress occurs inside. This bending stress caused by an external force is maximized in the vicinity of the center O of the dual IC card 1, and gradually decreases from the center O toward the first and second short side portions 2c and 2d.

Stress concentration occurs in a corner portion Pc which is formed by the third side surface portion 22c and the bottom of the first hole portion 22, and in a corner portion Pd which is formed by the fourth side surface portion 22d and the bottom of the first hole portion 22. The stress occurring in the corner portion Pd which is close to the center of the dual IC card 1 is larger than the stress occurring in the corner portion Pc which is close to the first short side portion 2c.

As shown in FIG. 14B, a bending stress similarly occurs inside the dual IC card 1 in the case where the dual IC card 1 is bent in a short-length direction. This bending stress caused by an external force is maximized in the vicinity of the center O of the dual IC card 1, and gradually decreases from the center O toward the first and second long side portions 2a and 2b.

If the deflections at both ends (first and second long side portions 2a and 2b) are equal to the deflections due to the bending in the longitudinal direction, a bending stress by the bending across the shorter dimension is larger than the bending stress caused by the bending in the longitudinal direction.

Stress concentration occurs in a corner portion Pa which is formed by the first side surface portion 22a and the bottom of the first hole portion 22, and in a corner portion Pb which is formed by the second side surface portion 22b and the bottom of the first hole portion 22. The stress occurring in the corner portion Pb which is close to the center of the dual IC card 1 is larger than the stress occurring in the corner portion Pa which is close to the first long side portion 2a.

Thus, the magnitude of the bending stress caused by the stress concentration in the IC module accommodating portion 21 is maximized in the corner portion Pb, and bending stresses occurring in the corner portions Pa, Pd, and Pc decrease in this order.

Accordingly, if the dual IC card 1 is bent, a high stress field due to the stress concentration is formed particularly between the corner portion Pb and the back surface 2f. This high stress field propagates in a specific range in the vicinity of the corner portion Pb, which leads to the increase of the stress occurring in an area located on the extension line of the corner portion Pb and in the vicinity of the corner portion Pb.

The stress concentration also occurs in the corner portions Pa, Pd, and Pc where, however, the bending stress due to the external force is small. Accordingly, there is generated no stress field against which reinforcement is particularly required.

Actually, the inventor conducted a durability test on a conventional dual IC card in which a wiring having a line width of 0.4 mm was arranged immediately below the corner portions. When there was a breakage in the looped wiring provided overlapping with the corner portion Pb or overlapping with a position on the extension line of the corner portion Pb, there was no breakage in the wirings provided at positions overlapping with the corner portions Pa, Pd, and Pc.

In the dual IC card 1 according to the second embodiment, the coupling coil portion 4A is located outside the IC module accommodating portion 21. Accordingly, no wiring is located immediately below the corner portions Pb, Pa, Pd and Pc. Thus, the dual IC card 1 according to the second embodiment is configured to be less influenced by the high stress field caused by a stress concentration.

The coil wiring A1 provided along the corner portion Pb where the largest stress occurs corresponds to the thick line portion A1b having a line width of not less than 1 mm. Therefore, wiring durability of the coil wiring A1 is improved, and thus the coil wiring A1 is prevented from being disconnected when the antenna 4 or the IC module accommodating portion 21 is displaced due to fabrication variations to cause the coil wiring A1 to partially overlap with the corner portion Pb.

Furthermore, the line width transition portions Atc and Atd are provided at positions intersecting the extension line Lb of the second side surface portion 22b. In this case, the line widths Wc and Wd overlapping with the extension line Lb are rendered be not less than 1 mm. Accordingly, the coil wiring A1 can be prevented from being disconnected caused by a high stress field generated on the extension line of the corner portion Pb.

Being spaced apart from the corner portion Pb, the coil wiring A2 is not influenced by a stress field caused by the stress concentration if the coil wiring A2 is provided on the extension line of the corner portion Pb. Accordingly, there is no risk of disconnection in the coil wiring A2 if the coil wiring A2 has a line width W.

The stress concentration at the first hole portion 22 has so far been described. A stress concentration similarly occurs in the corner portion where the side surface portions intersect the bottom surface portion in the second hole portion 23. However, the second hole portion 23 is formed inside the first hole portion 22 penetrating through the sheet substrate 41. Accordingly, no wiring will be located immediately below the corner portion. The stress concentration occurs in an area closer to the back surface 2f than to the sheet substrate 41. Accordingly, the influence of the stress concentration generated in the second hole portion 23 is negligible in the coil wiring A1 formed on a surface of the sheet substrate 41, the surface being close to the front surface 2e.

As described above, according to the dual IC card 1, since the coupling coil portion 4A is arranged outside the IC module accommodating portion 21, a failure due to the breakage of the coupling coil portion 4A can be minimized in the event that a bending stress caused by an external force is generated.

Third Embodiment

With reference to FIGS. 15 to 20, a third embodiment of a dual IC card according to the present invention will be described.

In FIGS. 15 to 20, components identical with those of the first and second embodiments are designated with identical reference signs to omit or simplify description.

Figure 15:
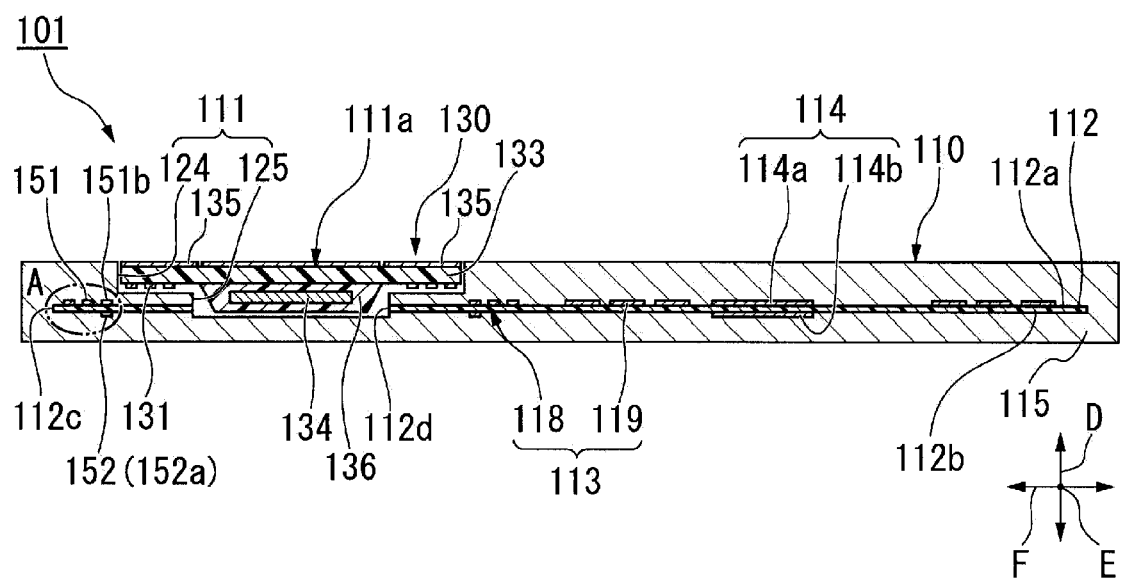
FIG. 15 is a schematic cross section illustrating a side surface of a dual IC card according to a third embodiment of the present invention.
Figure 16:
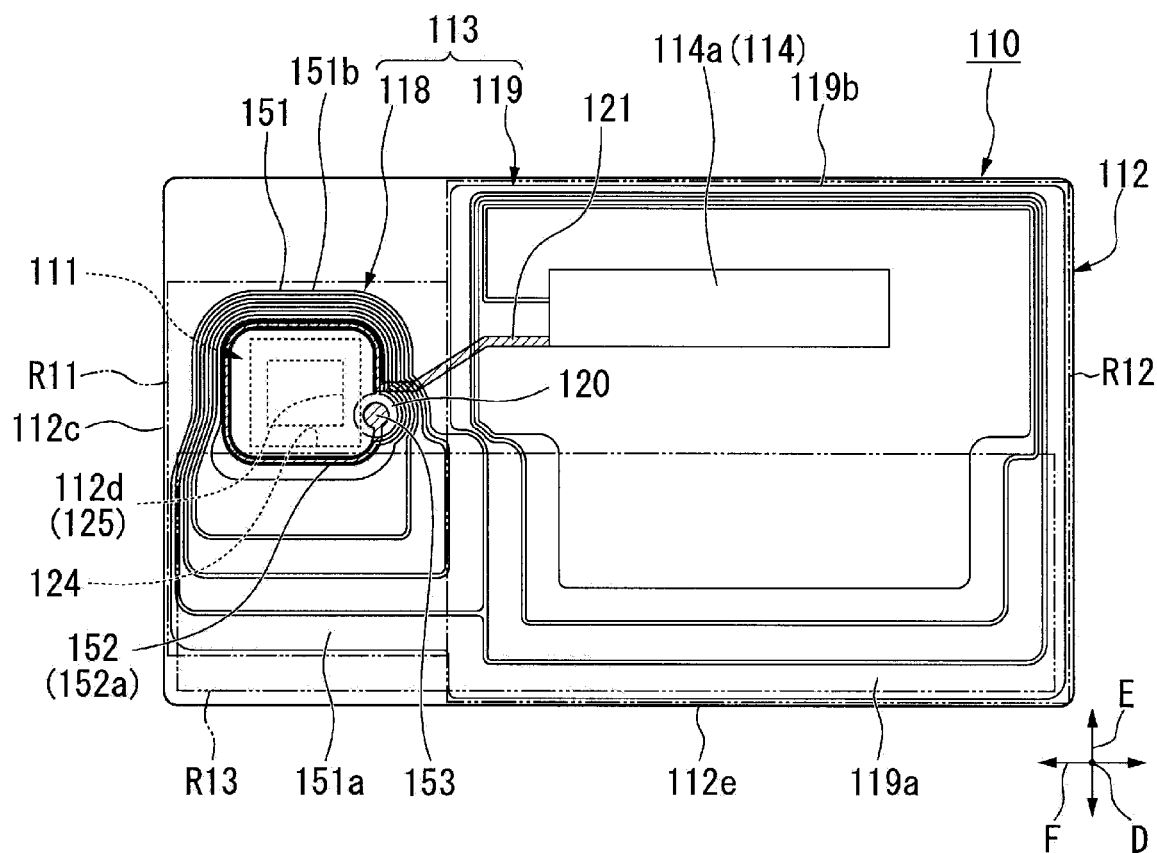
FIG. 16 is a partially transparent plan view illustrating a card body of the dual IC card according to the third embodiment of the present invention is made transparent.

As shown in FIGS. 15 and 16, a dual IC card 101 includes a plate-like card body 110 formed with a recess 111, and an IC module 130 accommodated in the recess 111.

FIG. 15 is a schematic cross section illustrating the dual IC card 101. In FIG. 15, an antenna 113 described later, which is looped several times, is simplified. In FIG. 16, the antenna 113 and a capacitive element 114 in the card body 110 are shown, with only the contour of the capacitive element 114 being shown as seen through the substrate 112. FIG. 16 shows, by hatching, a second coil segment 152, which is described below.

The card body 110 has a substrate 112, the antenna 113 provided on the substrate 112, the capacitive element 114 connected (electrically connected) to the antenna 113, and a card base 115 sealing the substrate 112, the antenna 113 and the capacitive element 114.

The substrate 112 is formed using an insulative material, such as PET (polyethylene terephthalate), polyethylene naphthalate (PEN), or the like, into a rectangular shape in plan view (see FIG. 16).

At a position close to a short side 112c of the substrate 112, an accommodating hole 112d penetrating the substrate 112 in a thickness direction D is formed. The accommodating hole 112d is formed into a rectangular shape, in plan view, with its sides being parallel to short or long sides of the substrate 112. The thickness of the substrate 112 is, for example, 15 to 50 μm (micrometers).

The antenna 113 has a coupling coil 118 for electromagnetic coupling with a connecting coil 131, described later, of the IC module 130, and a main coil 119 connected to the coupling coil 118 for performing contactless communication with an external contactless machine, such as a reader/writer (now shown). The coupling coil 118 is located in an area R11 in FIG. 16 and the main coil 119 is located in an area R12 adjacent to the area R11. At a position on the substrate 112 closer to a long side 112e than to the accommodating hole 112d, an embossed area R13 is provided so that an emboss can be formed based on a standard of IC cards (X 6302-1: 2005 (ISO/IEC 7811-1: 2002)).

Figure 17:
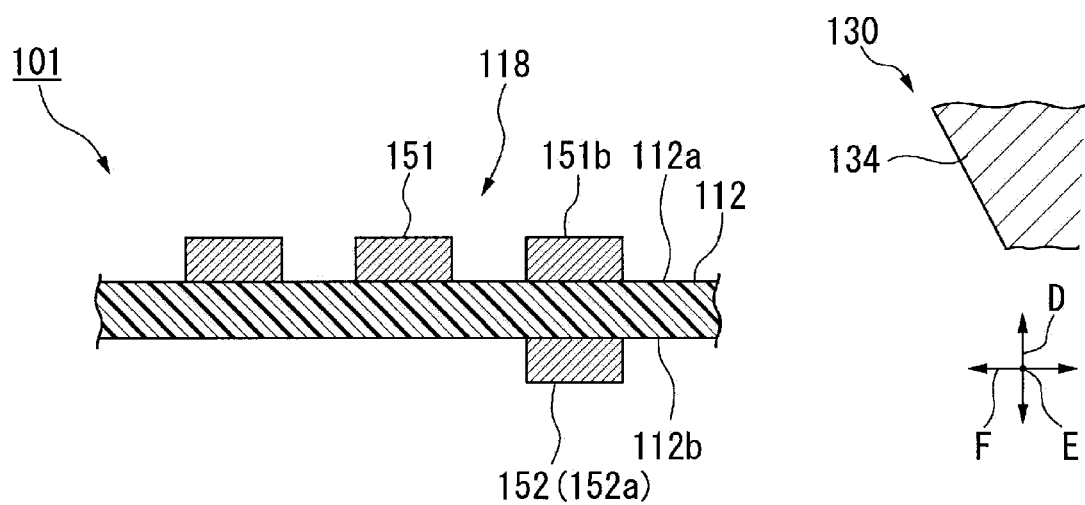
FIG. 17 is an enlarged view of a part A of FIG. 15.

In this example, as shown in FIGS. 16 and 17, the coupling coil 118 has a first coil segment 151 and the second coil segment 152. The first coil segment 151 is provided to the first surface 112a of the substrate 112 where an opening 111a (see FIG. 15) of the recess 111 is provided. The second coil segment 152 is provided to the second surface 112b of the substrate 112.

The first coil segment 151 is formed into a spiral shape, and looped five times around the IC module 130, or the recess 111, when viewed in the thickness direction D. The width of an element wire 151a configuring the first coil segment 151 in the embossed area R13 is larger than the width of an element wire 151b provided in an area other than the embossed area R13.

The element wire 151b located innermost of the first coil segment 151 has an end which is provided with a terminal portion 120 having a width larger than that of the element wire 151b and formed into a substantially circular shape. The terminal portion 120 is formed on the first surface 112a.

When viewed in the thickness direction D shown in FIG. 16, the second coil segment 152 is formed surrounding the IC module 130 by being looped only once. The element wire 152a of the second coil segment 152 has a first end located at a position overlapping with the terminal portion 120 of the coupling coil 118 in the thickness direction D. At the position, a terminal portion 153 is provided, with a width being larger than that of the element wire 152a and a shape being substantially circular. The second coil segment 152 is entirely arranged in an area other than the embossed area R13. The terminal portion 120 of the first coil segment 151 and the terminal portion 153 of the second coil segment 152 are electrically connected by performing a known crimping processing or the like. The capacitive element 114 is serially connected between the coupling coil 118 and the main coil 119.

In FIG. 15, the second coil segment 152, which is formed surrounding the IC module 130 is formed outside the IC module 130, may be formed overlapping with the IC module 130.

As shown in FIGS. 16 and 17, the element wire 151b located innermost of the first coil segment 151 and the element wire 152a of the second coil segment 152 overlap with each other around the IC chip 134 by one round when viewed in the thickness direction D. In this example, the width of the element wire 151b of the first coil segment 151 is equal to the width of the element wire 152a of the second coil segment 152.

The element wire 151b of the first coil segment 151 and the element wire 152a of the second coil segment 152, in the portion shown in FIG. 17, extend in an extending direction E parallel to the short side 112c of the substrate 112 described above. In other words, the element wires 151b and 152a shown in FIG. 17 overlap with each other without being displaced in an orthogonal direction F, which is orthogonal to both of the thickness direction D and the extending direction E.

The element wire 151b located innermost of the first coil segment 151 serves as an element wire of the first coil segment 151 nearest to the connecting coil 131 described later (see FIG. 15).

With the face-to-face arrangement of the element wires 151b and 152a via the substrate 112, the capacitor's capacitance of the antenna 113 is increased. However, as shown in FIG. 16, the second coil segment 152 overlaps with the first coil segment 151 only by one round.

As shown in FIG. 16, the main coil 119 is formed into a spiral shape and looped three times in the area R12. The width of an element wire 119a configuring the main coil 119 in the embossed area R13 is larger than the width of an element wire 119b in an area other than the embossed area R13. By increasing the width of the element wire 119a and the width of the element wire 151a mentioned above, the element wires 119a and 151a can be prevented from being disconnected when an emboss is formed in the embossed area R13.

The end of the element wire 151a located outermost of the first coil segment 151 is connected to an end of the element wire 119a located outermost of the main coil 119.

Although the line width and the spacing of the element wires 119b and 151b are not particularly limited, the line width thereof can be approximately 0.1 mm to 1 mm, and the spacing between the wires can be approximately 0.1 mm to 1 mm. The element wires 119a and 151a in the embossed area R13 can be formed with a line width of approximately 1 mm to 15 mm, and a spacing of approximately 0.1 mm to 1 mm between the wires.

As shown in FIGS. 15 and 16, the capacitive element 114 has an electrode plate 114a provided on the first surface 112a of the substrate 112, and an electrode plate 114b provided on the second surface 112b of the substrate 112. The electrode plates 114a and 114b are located to face each other with the substrate 112 being interposed therebetween.

The electrode plate 114a is connected to an end of the element wire 119b located innermost of the main coil 119.

The electrode plate 114b is connected to a connecting wiring 121 provided on the second surface 112b. The connecting wiring 121 is connected to a second end of the element wire 152a of the second coil segment 152.

The antenna 113, the capacitive element 114, and the connecting wiring 121 can be formed by etching a copper or aluminum foil using a resist-coating method based on generally used gravure printing, for example, for the substrate 112.

The card base 115 is formed into a rectangular shape in plan view (see FIG. 16) using an insulative material, including a polyester-based material such as amorphous polyester, a vinyl chloride-based material such as PVC (polyvinyl chloride), a polycarbonate-based material, PET-G (polyethylene terephthalate copolymer), or the like.

As shown in FIG. 15, the recess 111 mentioned above is formed in the card base 115. The recess 111 has a first accommodating portion 124 formed in a side surface of the card base 115, and a second accommodating portion 125 formed in a bottom surface of the first accommodating portion 124 and having a diameter smaller than that of the first accommodating portion 124. An opening of the first accommodating portion 124 on the side surface side of the card base 115 serves as the opening 111a mentioned above.

The substrate 112, the antenna 113, and the capacitive element 114 are sandwiched between a pair of films, and the pair of films are then integrated by hot-press laminating or bonding processing. Afterwards, the integrated film may be punched into a shape of a card body.

As shown in FIG. 15, the IC module 130 includes a sheet-like module base 133, an IC chip 134 and a connecting coil 131 which are provided on a first surface of the module base 133, and a plurality of contact terminals (contact terminal portions) 135 provided on a second surface of the module base 133.

The IC module 130 may further include an IC resin seal 136.

The module base 133 is formed into a rectangular shape in plan view using a material, including glass epoxy or PET (polyethylene terephthalate). The thickness of the module base 133 is 50 to 200 µm, for example.

As the IC chip 134, a chip with a known configuration having a contact communication function and a contactless communication function can be used.

The connecting coil 131 is formed into a spiral shape surrounding the IC chip 134 and the IC resin seal 136. The connecting coil 131 is formed by etching a copper or aluminum foil into a pattern, and has a thickness of 5 to 50 µm, for example. The connecting coil 131 configures a contactless terminal portion by electromagnetic coupling with the coupling coil 118 of the card body 110.

The plurality of contact terminals 135 are formed into a predetermined pattern by laminating a copper foil, for example on the second surface of the module base 133. A nickel layer having a thickness of 0.5 to 3 µm may be provided, by plating, in a portion of the copper foil exposed to the outside. On the nickel film, a gold layer having a thickness of 0.01 to 0.3 µm may be further provided by plating.

Each contact terminal 135 is used for contacting an external contact machine, such as an automatic teller machine. The contact terminals 135 are connected to an element or the like incorporated in the IC chip 134, not shown.

The IC chip 134 and the connecting coil 131 are connected via a wire, not shown. The IC chip 134, the connecting coil 131, and the wire configure a closed circuit.

A plurality of contact terminals may be formed using a lead frame having a thickness of 50 to 200 µm on the second surface of the module base 133, and the connecting coil may be formed using a copper wire on the first surface of the module base 133.

The resin seal 136 can be formed of a known epoxy resin, for example. With the resin seal 136 being provided, the IC chip 134 can be protected or a wire disconnection can be prevented.

Figure 18:
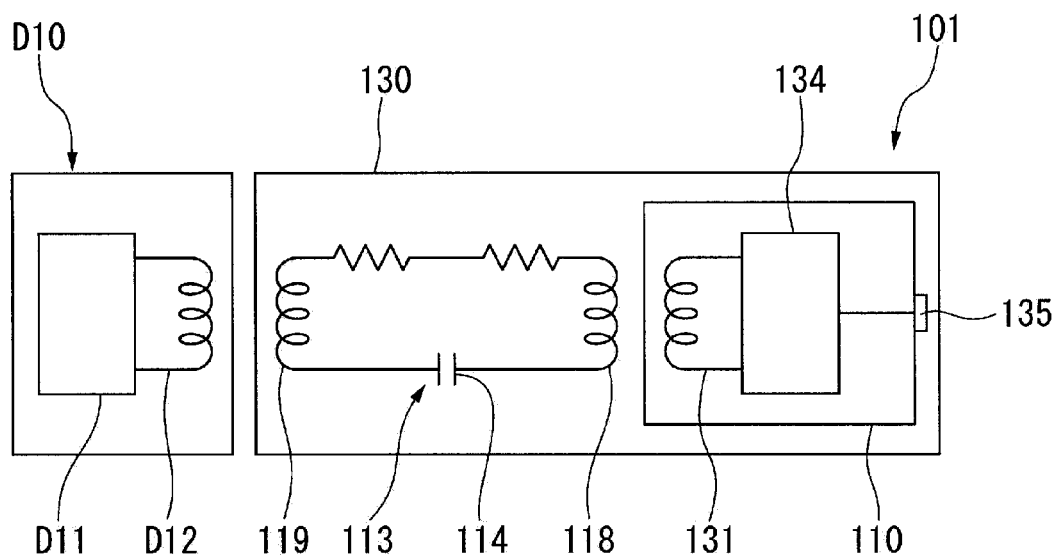
FIG. 18 is an equivalent circuit diagram illustrating a principle of the dual IC card according to the third embodiment of the present invention.

An operation of the dual IC card 101 configured in this way will now be described. FIG. 18 is an equivalent circuit diagram illustrating a principle of the dual IC card 101.

A high frequency magnetic field is induced in a reception/transmission coil D12 by a high frequency signal, not shown, generated by a reception/transmission circuit D11 of a reader/writer (contactless external machine) D10. The high frequency magnetic field is radiated as magnetic energy.

At this time, when the dual IC card 101 is positioned within the high frequency magnetic field, the high frequency magnetic field causes a current to flow through a parallel resonant circuit configured by the antenna 113 and the capacitive element 114 of the dual IC card 101.

A signal received by a resonant circuit formed of the main coil 119 and the capacitive element 114 is transmitted to the coupling coil 118. Afterwards, the signal is transmitted to the IC chip 134 by electromagnetic coupling between the coupling coil 118 and the connecting coil 131.

Although not shown, if the dual IC card 101 receives power supply from and communicate with an external contact machine such as an automatic teller machine, a terminal provided to the automatic teller machine is brought into contact with the contact terminals 135 of the dual IC card 101. Then power supply is received from and communication is performed with a control unit of the automatic teller machine and the IC chip 134.

As described above, according to the dual IC card 101 related to the third embodiment, the coupling coil 118 has the first coil segment 151 provided to the first surface 112a of the substrate 112 and the second coil segment 152 provided to the second surface 112b thereof. Since the coupling coil 118 is provided not only to the first surface 112a of the substrate 112 but also to the second surface 112b thereof, the degree of freedom in arranging the coupling coil 118 in the card body 110 can be increased.

Since both of the surfaces 112a and 112b of the substrate 112 are equipped with the coil segments 151 and 152, respectively, the degree of freedom can be increased in impedance matching adjustment of electromagnetic coupling between the connecting coil 131 of the IC module 130 and the coupling coil 118 of the card body 110. Thus, the impedance characteristics different between IC chips 134 are more reliably coped with, and performances, such as power supply, are optimized for more types of IC chips.

The second coil segment 152 is formed by being looped around the IC chip 134 only once.

Accordingly, if the element wire 151b of the first coil segment 151 and the element wire 152a of the second coil segment 152 overlap with each other in the thickness direction D, the coil segments 151 and 152 overlap with each other only by one round. Accordingly, increase and variation in the capacitor's capacitance of the antenna 113 can be minimized.

The third embodiment of the present invention has so far been described above in detail with reference to the drawings. However, the specific configuration is not limited to this embodiment, but encompasses modifications, combinations, or the like of the configurations, which are made within the scope not departing from the spirit of the present invention.

Figure 19:
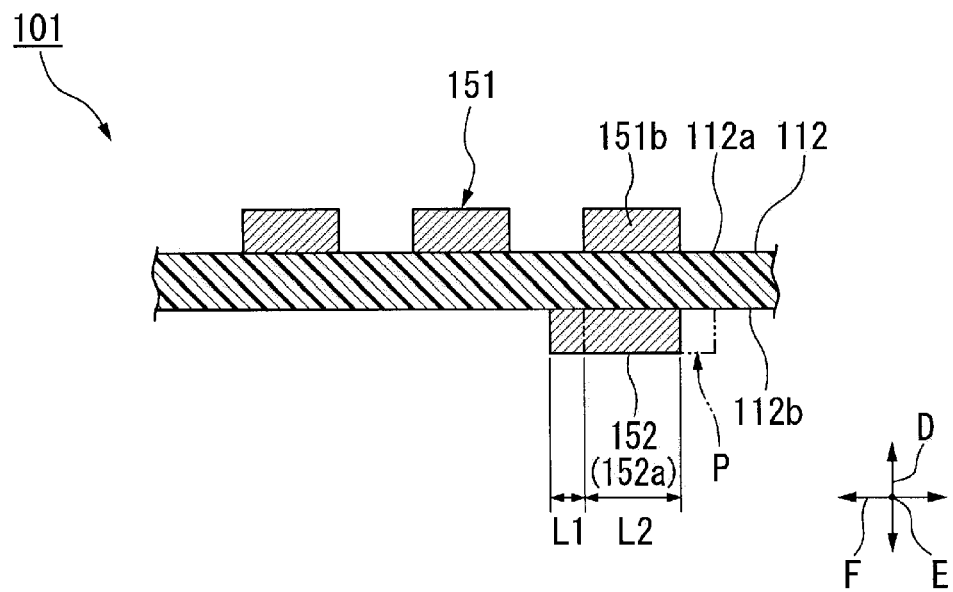
FIG. 19 is a cross section illustrating a major part of a dual IC card according to a modification of the third embodiment of the present invention.

For example, as shown in FIG. 19, in third embodiment, the width of the element wire 152a of the second coil segment 152 may be larger than the width of the element wire 151b of the first coil segment 151 in portions of the overlap in the thickness direction D between the element wire 151b and the element wire 152a. In this example, the width of the element wire 152a of the second coil segment 152 is larger than the width of the element wire 151b of the first coil segment 151 by a length L1 of 0.5 mm in portions of the overlap in the thickness direction D between the element wire 151b and the element wire 152a.

The positional displacement caused by the etching of the resist-coating method based on gravure printing mentioned above is approximately 0.5 mm. For example, in forming the element wire 152a, the element wire 152a may be displaced in the orthogonal direction F relative to the element wire 151b and formed at a position P. In the case where the element wire 152a is formed at a designed position or in the case where the element wire 152a is formed at the position P displaced from the designed position, a length L2 in the orthogonal direction F remains unchanged in portions where the element wires 151b and 152a face each other.

With this configuration, the capacitor's capacitance can be suppressed from being varied between the element wires 151b and 152a, depending on whether there is positional displacement of the element wire 152a to thereby improve communication characteristics of the dual IC card 101.

The width of the element wire 151b may be larger than that of the element wire 152a in the present modification.

Figure 20:
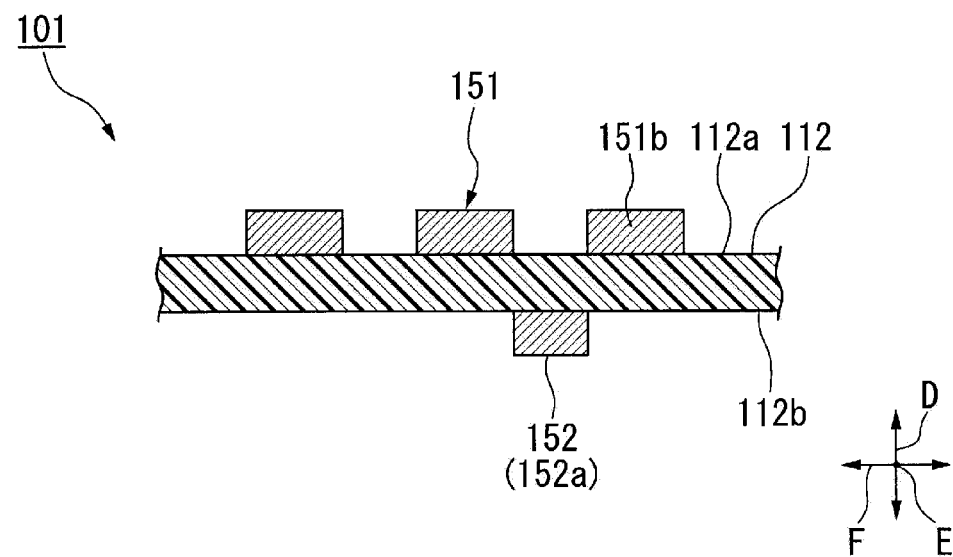
FIG. 20 is a cross section of a major part of the dual IC card according to a modification of the third embodiment of the present invention.

As shown in FIG. 20, the first and second coil segments 151 and 152 may have portions where the segments do not overlap with each other when viewed in the thickness direction D. With this configuration, generation of capacitor's capacitance by the element wires 151b and 152a can be minimized.

In the third embodiment, the second coil segment 152 is formed by being looped around the IC module 130 only once. This is applied to the case of using an IC chip where communication characteristics are influenced by the variations in capacitor's capacitance formed between the first and second coil segments 151 and 152. Accordingly, the number of times by which the second coil segment 152 is looped around the IC module 130 is not limited to once, but may be two or more times depending on performance of the IC chip to be used.

In the case of using a configuration where the capacitive element 114 can be adjusted after forming the antenna, variations in the capacitor's capacitance formed between the first and second coil divided bodies 151 and 152 can be cancelled. Accordingly, regardless of the characteristics of IC chips, the number of times by which the second coil segment 152 looped around the IC module 130 can be optionally determined, and an optimal impedance matching design can be applied.

The configuration where the capacitive element 114 can be adjusted after forming the antenna increases cost compared to the configuration where the capacitive element 114 cannot be adjusted after forming the antenna. Accordingly, to reduce cost and minimize variations in communication characteristics, the number of times by which the second coil segment 152 is looped around the IC module 130 is preferably not more than two times in the configuration where the capacitive element 114 cannot be adjusted after forming the antenna.

The element wire 151b arranged innermost of the first coil segment 151 and the element wire 152a of the second coil segment 152 overlap with each other around the IC chip 134 by one round when viewed in the thickness direction D. However, these element wires 151b and 152a only need to overlap with each other at least partially when looped around the IC chip 134.

In the third embodiment, the main coil 119 and the connecting coil 131 are looped three times around the recess 111, while the first coil segment 151 is looped five times around the recess 111. However, the numbers of times by which these coils 118 and 119, and the first coil segment 151 are looped are not limited to the numbers in the above-described embodiment. The coils 118 and 119, and the first coil segment 151 only need to be looped one or more times.

The number of the contact terminals 135 possessed by the contact terminal portion does not necessarily have to be two or more but may be one.

In the third embodiment, the width of the element wire 152a of the second coil segment 152 is larger than the width of the element wire 151b of the first coil segment 151 by 0.5 mm in the portions where the element wire 151b and the element wire 152a overlap with each other in the thickness direction D. However, the width of the element wire 152a may be configured to be larger than the width of the element wire 151b by not less than 0.5 mm but not more than 1 mm. Positional displacement in forming the antenna by etching is approximately 0.5 mm as described above. Accordingly, as long as the displacement is within this range, the overlap between the element wires 151b and 152a can be made constant. Depending on designs, the width of the element wire 151b may be made larger than the width of the element wire 152a.

EXAMPLE

In an example of the dual IC card 101 shown in FIG. 16, the dual IC card 101 was fabricated under the conditions described below.

The substrate 112 was formed of PET with a thickness of 38 μm. The first surface 112a of the substrate 112 was laminated with an aluminum foil having a thickness of 30 μm, followed by the etching mentioned above to thereby form the antenna 113 and the capacitive element 114. The second surface 112b was laminated with an aluminum foil having a thickness of 20 μm, followed by the etching mentioned above to thereby form the connecting wiring 121. The width of the element wire 151b of the first coil segment 151 was 0.4 mm, while the width of the element wire 152a of the second coil segment 152 was 0.9 mm.

Preferable embodiments of the present invention have so far been described. However these embodiments only exemplifications of the present invention and should be construed as being limitative. Additions, omissions, replacements, and other changes can be made without departing from the scope of the present invention. Accordingly, the present invention should not be regarded as being limitative by the description provided above, but is limited by the appended claims.

REFERENCE SIGNS LIST 1, 1A, 1B, 1C, 1D, 1E, 101: dual IC card
2, 110: card body
2a: first long side portion
2b: second long side portion
2c: first short side portion
2d: second short side portion
2e: front surface
2f: back surface
3: IC module
4: antenna
4A: coupling coil portion
4B: main coil portion
5: first embossed area
5a: boundary
6: second embossed area
21: IC module accommodating portion (recess)
22: first hole portion
23: second hole portion
22a: first side surface portion
22b: second side surface portion (linear portion)
31: connecting terminal portion (contact terminal portion)
32: module substrate
33: IC chip
34: connecting coil
41: sheet substrate
42: capacitive element
51, 52, 53B, 59A, 59B, 59C, B3a: resistance-increasing portion (first bent pattern)
53, 53C, 54, 58: wiring portion
53A, 54A, 53C, 54C, A1a, A1c, A1d, A2a, A2c, A2d, A3a, A3c, A3d, A4a, A4c, A4d, A5a, A5c, A5d, B1a, B1c, B2a: thin line portion
54B: resistance-increasing portion (second bent pattern)
55: end wiring
56: meandering wiring (second bent pattern)
57: end wiring
59a, 59b: spiral wiring
111: recess
111a: opening
112: substrate
112a: first surface
112b: second surface
113: antenna
118: coupling coil
119: main coil
130: IC module
131: connecting coil
134: IC chip
135: contact terminal (contact terminal portion)
151: first coil segment
151a, 151b, 152a: element wire
152: second coil segment
A1, A2, A3, A4, A5, B1, B2, B3, B11, B12, B13: coil wiring
A1b, A2b, A3b, A4b, A5b, B1b, B2b, B3b, B3c, B3d: thick line portion
Atc, Atd: line width transition portion
B1d, B2c, B2d: lateral wiring portion
B3': equivalent coil wiring
Lb: extension line
Pb, Pa, Pd, Pc: corner portion
O: straight line
S1: opening area increase
S2: opening area decrease
D: thickness direction
D10: reader/writer

What is claimed is:
1. A dual IC card comprising:
an IC module including a contact terminal portion contacting an external machine, a connecting coil configuring a contactless terminal portion by electromagnetic coupling, and an IC chip having a contact communication function and a contactless communication function;
an antenna including a coupling coil portion formed along a coil wiring path that defines an inductance and electromagnetically coupling with the connecting coil of the IC module, a main coil portion formed along a coil wiring path that defines an inductance and connected to the coupling coil portion to perform contactless communication with the external machine, and a resistance-increasing portion provided in a section that forms the coil wiring path of at least one of the coupling coil portion and the main coil portion to increase electrical resistance in the section; and
a plate-like card body in which the antenna is arranged, wherein:
in the resistance-increasing portion, a resistance wiring portion is provided in the section forming the coil wiring path, the resistance wiring portion having a line length larger than a length of a direct connection, the direct connection having a shortest distance between a first point and a second point that define the section forming the coil wiring path, having the same cross-sectional area as that of the direct connection, and being formed of the same material as that of the direct connection, wherein the resistance wiring portion is defined between the first point and the second point, and is co-extensive in an axial direction with the direct connection, such that a first end of the resistance wiring portion and a second end of the resistance wiring portion are respectively aligned with a first end of the direct connection and a second end of the direct connection such that the first ends of the resistance wiring portion and the direct connection have a first same position in the axial direction and the second ends of the resistance wiring portion and the direct connection have a second same position in the axial direction;

the resistance wiring portion provided in the section has an electrical resistance higher than that of the direct connection provided in the section, the electrical resistance of the resistance wiring portion in the resistance-increasing portion is higher than that of the direct connection, the coupling coil portion comprises a first coil segment and a second coil segment;

the first coil segment and the second coil segment at least partially overlap with each other when viewed in a thickness direction of the substrate;

the first coil segment and the second coil segment have respective element wires with different line widths in portions where the first coil segment and the second coil segment overlap with each other in the thickness direction of the substrate, the resistance-increasing portion has a line width of not more than 0.4 mm;

the resistance-increasing portion has a rectangular wave pattern; and the resistance-increasing portion is arranged inside an outermost portion of the main coil portion, the outermost portion having a line width of 0.4 mm or more.

2. The dual IC card of claim 1, wherein the resistance-increasing portion is configured by a wiring pattern including a first bent pattern that intersects the direct connection a plurality of times.

3. The dual IC card of claim 1, wherein the wiring pattern configuring the resistance-increasing portion includes second bent patterns arranged parallel to the direct connection in a multiple manner.

4. The dual IC card of claim 1, wherein the resistance-increasing portion is provided in the main coil portion.

5. The dual IC card of claim 1, wherein:
the card body has an embossed portion formed therein; and
the resistance-increasing portion is formed in an area that does not overlap with the embossed portion.

6. The dual IC card of claim 1, wherein:
the card body has a rectangular contour, in plan view, having a first long side portion and a second long side portion;
the first long side portion is provided, in the vicinity, with an emboss-processing-enabled area that is located along the first long side portion;
the second long side portion is provided, in the vicinity, with an emboss-processing-prohibited area that is located along the second long side portion;
the resistance-increasing portion is formed in the emboss-processing-prohibited area, and
the card body is configured such that when the card body is deformed by bending, a bending stress is maximal at a center of the card body and decreases from the center toward the first and second long side portions.

7. The dual IC card of claim 1, wherein:
the card body is formed into a rectangular shape; and
the resistance-increasing portion is formed on the coil wiring path that is linear and extends along a long side of the card body, in an outermost of the main coil portion.

8. The dual IC card of claim 1, wherein the resistance-increasing portion is formed of an aluminum layer having a thickness of not more than 30 μm.

9. The dual IC card of claim 1, wherein the resistance-increasing portion is formed of an aluminum layer.

10. The dual IC card of claim 1, wherein
the resistance wiring portion comprises a plurality of linear portions forming a rectangular wave pattern, and
a plurality of the linear portions have a first length in a first direction from a longitudinal axis of the resistance wiring portion and a second length in a second direction from the longitudinal axis, when the dual IC card is viewed in plan view,
the first length and second length are equal to each other,
the linear portions are arranged between a first point along the longitudinal axis and a second point spaced from the first point along the longitudinal axis, and
the resistance-increasing portion has a line width of a constant value.

11. The dual IC card of claim 1, wherein the resistance wiring portion comprises a plurality of spiral portions.

12. The dual IC card of claim 1, wherein the main coil is configured by being looped three times.

13. The dual IC card of claim 12, wherein the outermost portion of the main coil is an outermost third looping formed of a first portion having a first width and routed in a first direction, a second portion having a second width and routed in a second direction, and a third portion having a third width and routed in the first direction, wherein the second width is less than the first width and greater than the third width.

14. A dual IC card comprising:
an IC module including a contact terminal portion contacting an external machine, a connecting coil configuring a contactless terminal portion by electromagnetic coupling, and an IC chip having a contact communication function and a contactless communication function;
an antenna including a coupling coil portion for electromagnetically coupling with the connecting coil of the IC module, a main coil portion connected to the coupling coil portion to perform contactless communication with the external machine, and a resistance wiring portion in a section forming a coil wiring path of at least one of the coupling coil portion or the main coil portion, and having a higher resistance than a direct connection between a first point and a second point defining the section forming the coil wiring path, the direct connection having a shortest distance between the first point and the second point, wherein the resistance wiring portion is defined between the first point and the second point, and is co-extensive in an axial direction with the direct connection, such that a first end of the resistance wiring portion and a second end of the resistance wiring portion are respectively aligned with a first end of the direct connection and a second end of the direct connection such that the first ends of the resistance wiring portion and the direct connection have a first same position in the axial direction and the second ends of the resistance wiring portion and the direct connection have a second same position in the axial direction; and a plate-like card body in which the antenna is arranged and a recess is formed for accommodation of the IC module, wherein:

the coupling coil portion is located at a position outside the recess of the card body when viewed from an opening side of the recess, the electrical resistance of the resistance wiring portion is higher than that of the direct connection, the resistance wiring portion includes a resistance-increasing portion having a line width of not more than 0.4 mm;

the resistance-increasing portion has a rectangular wave pattern; and the resistance-increasing portion is arranged inside an outermost portion of the main coil portion, the outermost portion having a line width of 0.4 mm or more.

15. The dual IC card of claim 14, wherein:
the card body is formed into a rectangular plate,
the recess has an opening formed into a substantially rectangular shape having four linear portions parallel to a contour of the card body; and
the coupling coil portion has a an innermost wiring with a line width of not less than 1 mm at a position where the innermost wiring intersects an extension line of one linear portion among the four linear portions, the linear portion being formed at a position nearest to a center of the card body in a direction of a shorter dimension of the card body and extended in a longitudinal direction of the card body.

16. The dual IC card of claim 15, wherein:
the innermost wiring of the coupling coil portion includes a thick line portion having a line width of not less than 1 mm and a thin line portion having a line width of less than 1 mm at positions sandwiching the extension line;
the thick line portion and the thin line portion are connected via a line width transition portion that has a width gradually increasing from the line width of the thin line portion to the line width of the thick line portion,
an accommodating hole penetrating the substrate in the thickness direction of the substrate is formed with sides parallel to at least a side of the substrate when viewed in plan view, and
an embossed portion is formed on the substrate closer to a side of the card body in a longer dimension of the card body than to the accommodating hole, and
at least a portion of the wiring of the coupling coil portion in the embossed portion is thicker than a portion of the wiring of the coupling coil portion outside the embossed area.

17. A dual IC card comprising:
an IC module including a contact terminal portion contacting an external machine, a connecting coil configuring a contactless terminal portion by electromagnetic coupling, and an IC chip having a contact communication function and a contactless communication function;

an antenna including a coupling coil for electromagnetically coupling with the connecting coil of the IC module, a main coil connected to the coupling coil to perform contactless communication with an external contactless machine, and a resistance wiring portion in a section forming a coil wiring path of at least one of the coupling coil portion or the main coil portion, and having a higher resistance than a direct connection between a first point and a second point defining the section forming the coil wiring path, the direct connection having a shortest distance between the first point and the second point, wherein the resistance wiring portion is defined between the first point and the second point, and is co-extensive in an axial direction with the direct connection, such that a first end of the resistance wiring portion and a second end of the resistance wiring portion are respectively aligned with a first end of the direct connection and a second end of the direct connection such that the first ends of the resistance wiring portion and the direct connection have a first same position in the axial direction and the second ends of the resistance wiring portion and the direct connection have a second same position in the axial direction; and a plate-like card body in which a recess is formed for accommodation of the IC module, wherein:
the card body has a substrate;
the coupling coil includes a first coil segment provided to a first surface that serves as an opening side of the recess of the substrate, and a second coil segment provided to a second surface of the substrate,
the resistance wiring portion includes a resistance-increasing portion having a line width of not more than 0.4 mm;
the resistance-increasing portion has a rectangular wave pattern; and
the resistance-increasing portion is arranged inside an outermost portion of the main coil portion, the outermost portion having a line width of 0.4 mm or more.

18. The dual IC card of claim 17, wherein the second coil segment is looped around the IC module once when viewed in a thickness direction of the substrate.

19. The dual IC card of claim 17, wherein:
the first coil segment and the second coil segment at least partially overlap with each other when viewed in the thickness direction of the substrate; and
the first coil segment and the second coil segment have respective element wires with different line widths in portions where the first coil segment and the second coil segment overlap with each other in the thickness direction.

20. The dual IC card of claim 19, wherein the first coil segment and the second coil segment have respective element wires whose difference in line widths is not less than 0.5 mm in portions where the first coil segment and the second coil segment overlap with each other in the thickness direction.

* * * * *